(12) United States Patent
Ito et al.

(10) Patent No.: US 12,711,410 B2
(45) Date of Patent: Aug. 18, 2026

(54) QUANTUM COMPUTATION CONTROL METHOD AND INFORMATION PROCESSING APPARATUS

(71) Applicants: Fujitsu Limited, Kawasaki (JP); Tokyo Electron Limited, Tokyo (JP)

(72) Inventors: Yuto Ito, Kawasaki (JP); Tomohisa Nagata, Sapporo (JP)

(73) Assignees: Fujitsu Limited, Kawasaki (JP); Tokyo Electron Limited, Tokyo (JP)

( * ) Notice: Subject to any disclaimer, the term of this patent is extended or adjusted under 35 U.S.C. 154(b) by 9 days.

(21) Appl. No.: 19/052,322

(22) Filed: Feb. 13, 2025

(65) Prior Publication Data

US 2025/0272589 A1 Aug. 28, 2025

(30) Foreign Application Priority Data

Feb. 27, 2024 (JP) ................................ 2024-027825

(51) Int. Cl.
*G06N 10/20* (2022.01)

(52) U.S. Cl.
CPC .................................. *G06N 10/20* (2022.01)

(58) Field of Classification Search
CPC ........ G06N 10/20; G06N 10/00; G06N 10/40; G06N 10/70; G06N 10/60
USPC ........................................................ 327/527
See application file for complete search history.

(56) References Cited

U.S. PATENT DOCUMENTS

2019/0251466 A1 8/2019 Mezzacapo et al.
2022/0284339 A1 9/2022 Wang et al.
2023/0315808 A1 10/2023 Babbush
2024/0013865 A1 1/2024 Takahashi
2025/0292143 A1* 9/2025 Akahoshi .............. G06N 10/40
2026/0004172 A1* 1/2026 Akahoshi .............. G06N 10/20
2026/0080289 A1* 3/2026 Takemori .............. G06N 10/60

FOREIGN PATENT DOCUMENTS

JP 2020-534607 A 11/2020
JP 2022-544926 A 10/2022
JP 2023-099003 A 7/2023

OTHER PUBLICATIONS

Extended European Search Report issued Jul. 8, 2025 in corresponding European Patent Application No. 25160397.3, 8 pages (Continued)

*Primary Examiner* — Hai L Nguyen
(74) *Attorney, Agent, or Firm* — XSENSUS LLP

(57) ABSTRACT

An information processing apparatus creates qubit pairs, each being formed by combining first and second qubits. A first qubit corresponds to a first orbital on which an electron is present in an initial arrangement. A second qubit corresponds to a second orbital on which no electron is present in the initial arrangement. The apparatus generates a quantum circuit that applies two-qubit gates to at least some of the qubit pairs. Each two-qubit gate generates, based on the value of a parameter, a superposition state of a first state in which the states of the first and second qubits are not switched and a second state in which these states are switched. The apparatus acquires an energy expectation value in the ground state of the molecule by causing a quantum computer to iteratively execute the quantum circuit.

7 Claims, 18 Drawing Sheets

(56) References Cited

OTHER PUBLICATIONS

Materia Davide et al: “Quantum Information Driven Ansatz (QIDA): Shallow-Depth Empirical Quantum Circuits from Quantum Chemistry”, The Journal of Physical Chemistry A, [Online] vol. 128, No. 39, Sep. 26, 2023 (Sep. 26, 2023), pp. 1-16, XP093288152, US ISSN: 1089-5639, DOI: 10.1021/acs.jpca.4c03756 Retrieved from the Internet: URL:https://arxiv.org/pdf/2309.15287> [retrieved on Jun. 19, 2025].

Gard et al., “Efficient symmetry-preserving state preparation circuits for the variational quantum eigensolver algorithm”, npj, Quantum Information, vol. 6, Article No. 10, Jan. 28, 2020, 9 pages.

Peruzzo et al., “A variational eigenvalue solver on a photonic quantum processor”, Nature Communications, vol. 5, Article No. 4213, Jul. 23, 2014, pp. 1-7.

* cited by examiner

41 VQE EXECUTION RESULTS ACCORDING TO COMPARISON EXAMPLE (boxA IS APPLIED TO EACH PAIR OF ADJACENT QUBITS)

| NUMBER OF LAYERS | DEPTH | NUMBER OF QUANTUM GATE boxAs | NUMBER OF PARAMETERS | NUMBER OF ITERATIONS OF VQE | PROCESSING TIME | ENERGY EXPECTATION VALUE |
|---|---|---|---|---|---|---|
| 1 | 2 | 13 | 26 | 16 | 1000 | −30.6299 |
| 2 | 4 | 26 | 52 | 24 | 5000 | −30.7026 |
| 3 | 6 | 39 | 78 | 27 | 13000 | −30.7029 |

42 VQE EXECUTION RESULT ACCORDING TO PROPOSED TECHNIQUE (boxA IS APPLIED TO EACH PAIR OF QUBIT CORRESPONDING TO OCCUPIED ORBITAL AND QUBIT CORRESPONDING TO UNOCCUPIED ORBITAL)

| NUMBER OF OCCUPIED AND UNOCCUPIED ORBITALS CORRESPONDING TO SAME SPIN | DEPTH | NUMBER OF QUANTUM GATE boxAs | NUMBER OF PARAMETERS | NUMBER OF ITERATIONS OF VQE | PROCESSING TIME | ENERGY EXPECTATION VALUE |
|---|---|---|---|---|---|---|
| (5,2) | 5 | 20 | 40 | 10 | 2000 | −30.7028 |

FIG. 11

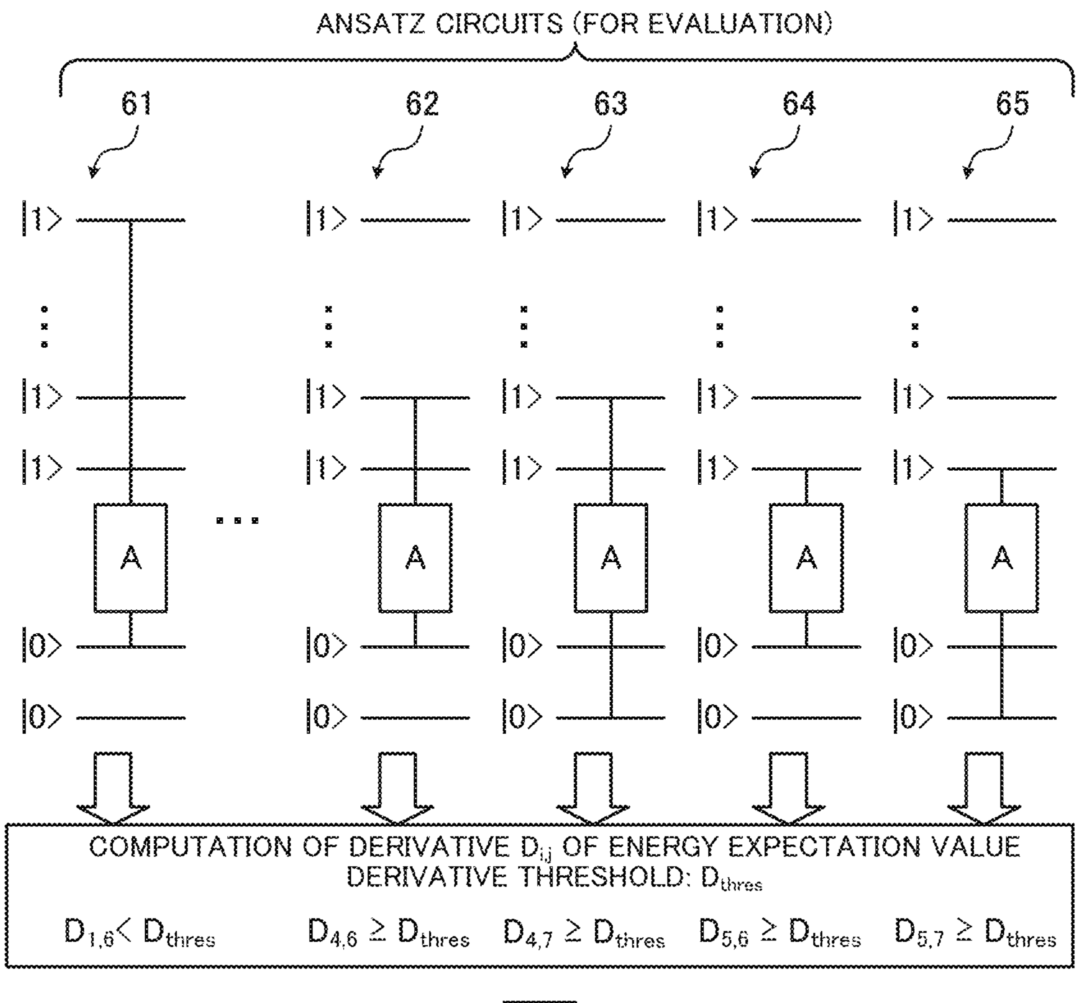
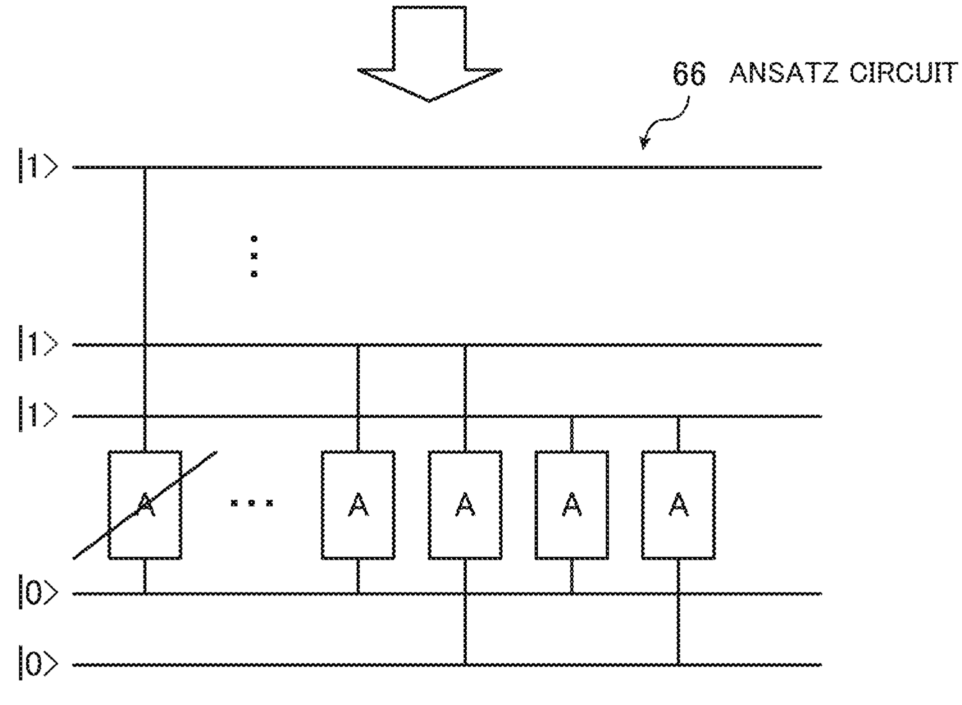
FIG. 15

QUANTUM COMPUTATION CONTROL METHOD AND INFORMATION PROCESSING APPARATUS

CROSS-REFERENCE TO RELATED APPLICATION

This application is based upon and claims the benefit of priority of the prior Japanese Patent Application No. 2024-027825, filed on Feb. 27, 2024, the entire contents of which are incorporated herein by reference.

FIELD

The embodiments discussed herein relate to a quantum computation control method and an information processing apparatus.

BACKGROUND

A computation technique referred to as "variational quantum eigensolver (VQE)" is used for quantum chemical computation using a quantum computer. The VQE is a technique for computing an eigenvalue of a physical quantity (for example, the minimum eigenvalue of energy) in a many-electron system quantum mechanics and for computing an eigenstate. In the VQE, for example, the energy expectation value (the minimum eigenvalue of energy) in the ground state of a molecule is computed in accordance with the following procedure.

1. Controlled by a classical computer, a trial state $|\psi(\theta)>$ of a many-electron system in quantum mechanics is generated within a quantum computer ($\theta$ is a real number parameter).
2. The quantum computer computes an energy expectation value "$<\psi(\theta)|H|\psi(\theta)>$" in the trial state (H is the Hamiltonian).
3. Based on the computation result of the energy expectation value, the classical computer updates the value of the individual parameter $\theta$ such that the energy expectation value "$<\psi(\theta)|H|\psi(\theta)>$" is minimized.

Based on the coordination operation between the classical computer and the quantum computer, the above process is iterated until the value of the energy expectation value "$<\psi(\theta)|H|\psi(\theta)>$" converges. As a result, an approximate minimum energy value and a corresponding state are obtained.

As the function form of the trial state $|\psi(\theta)>$, a function form having a good computation efficiency in the quantum computer is selected. Examples of the trial state include a unitary coupled-cluster (UCC) ansatz and a symmetry-preserving ansatz.

As a VQE-related technique, there has been proposed a method for estimating an expected value of a quantum-mechanical observable. This method executes operator averaging within a quantum algorithm or a classical-quantum algorithm while reducing the number of state preparations and measurement iterations, for example. In addition, there has been proposed a system for realizing hardware-efficient VQE for quantum computing machines. In addition, there has been proposed a computer-implemented method for determining a measurement value for each of a plurality of operators. See, for example, the following documents.

Japanese Laid-open Patent Publication No. 2023-99003

Japanese National Publication of International Patent Application No. 2020-534607

Japanese National Publication of International Patent Application No. 2022-544926

Bryan T. Gard, Linghua Zhu, George S. Barron, Nicholas J. Mayhall, Sophia E. Economou, and Edwin Barnes, "Efficient symmetry-preserving state preparation circuits for the variational quantum eigensolver algorithm", npj Quantum Information volume 6, Article number: 10 (2020), 28 Jan. 2020

SUMMARY

In one aspect, there is provided a non-transitory computer-readable recording medium storing therein a computer program that causes a computer to execute a process including: creating, from a plurality of qubits, a plurality of qubit pairs, each of which is formed by combining a first qubit corresponding to a first orbital on which an electron is present in an initial arrangement and a second qubit corresponding to a second orbital on which no electron is present in the initial arrangement, each of the plurality of qubits indicating presence or absence of an electron occupying a corresponding one of a plurality of orbitals of a molecule; generating a quantum circuit that applies two-qubit gates to at least some of the plurality of qubit pairs, each of the two-qubit gates generating, based on a value of a parameter, a superposition state of a first state in which a state of the first qubit and a state of the second qubit are not switched and a second state in which the state of the first qubit and the state of the second qubit are switched; and acquiring an energy expectation value in a ground state of the molecule by causing a quantum computer to iteratively execute the quantum circuit while updating the value of the parameter of the each of the two-qubit gates.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 illustrates examples of VQE execution results;

FIG. 15 illustrates a second example of the ansatz circuit that applies a quantum gate boxA only to qubit pairs having a high effect on dropping an energy expectation value;

DESCRIPTION OF EMBODIMENTS

A symmetry preserving ansatz is able to realize a superposition state of a Hartree-Fock state and an excited state with a simpler quantum gate than a UCC ansatz. However, with the symmetry-preserving ansatz, gate operations are applied only to pairs of adjacent qubits. Thus, to obtain an accurate result, the gate operations are iteratively executed on these pairs of adjacent qubits. As a result, the circuit length of the ansatz deepens, and the number of parameters increases. As the circuit length deepens, it takes more time to compute a single energy expectation value. In addition, a greater number of parameters results in a greater number of iterations of the computation until the energy expectation value converges, and consequently, it takes more time for the overall VQE computation. Thus, with the conventional techniques, it takes more time to accurately compute the energy expectation value in the ground state of a molecule based on the VQE.

Hereinafter, several embodiments will be described with reference to the accompanying drawings. An individual embodiment may be carried out by combining a plurality of embodiments, as long as there is no contradiction.

First Embodiment

A first embodiment describes a quantum computation control method that enables efficient computation of the energy expectation value in the ground state of a molecule while minimizing deterioration of the computation accuracy.

Figure 1:
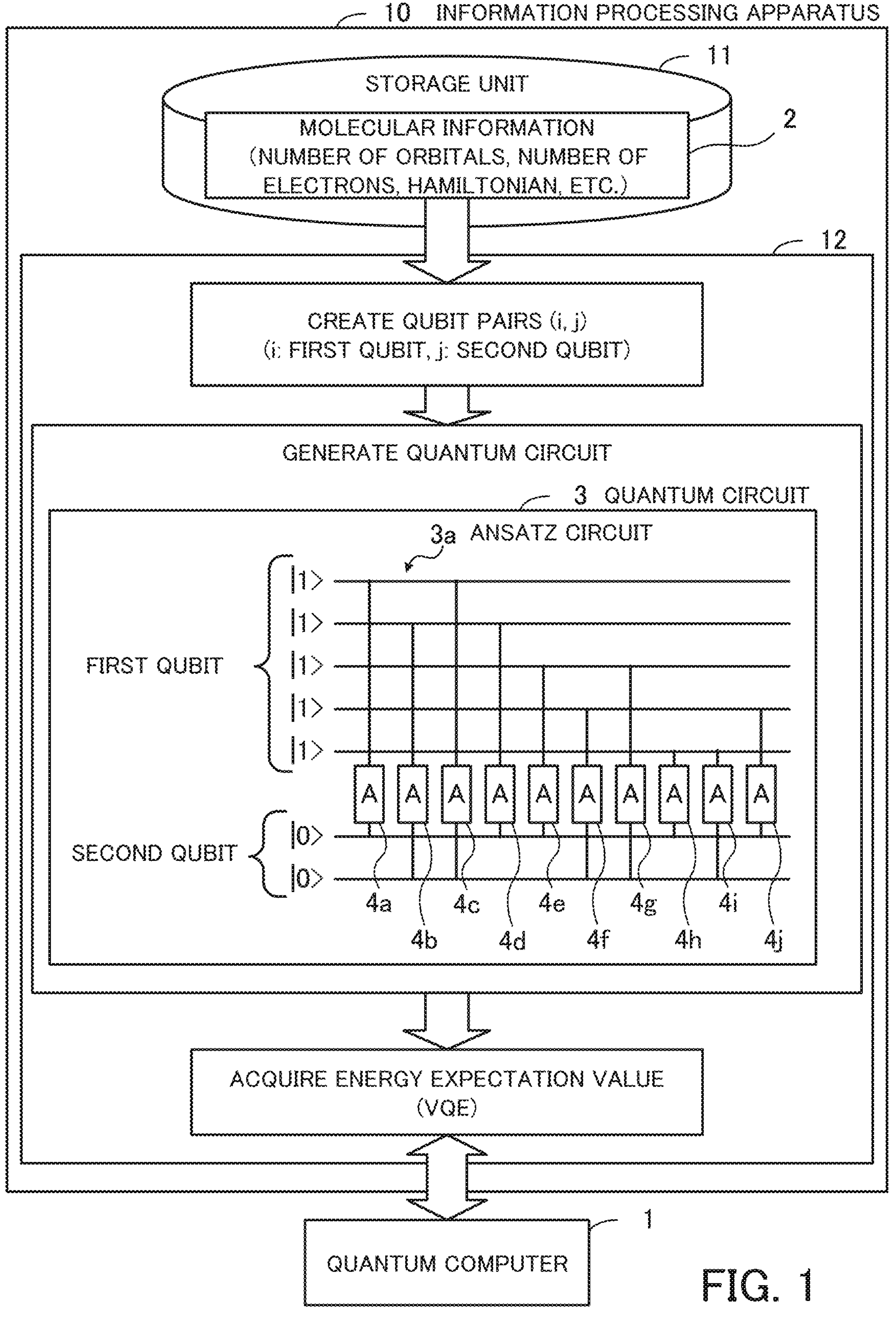
FIG. 1 illustrates an example of a quantum computation control method according to a first embodiment.

FIG. 1 illustrates an example of a quantum computation control method according to the first embodiment. FIG. 1 illustrates an information processing apparatus 10 that executes the quantum computation control method. The information processing apparatus 10 is able to execute the quantum computation control method by executing a quantum computation control program, for example.

The information processing apparatus 10 includes a storage unit 11 and a processing unit 12. The storage unit 11 is, for example, a memory or a storage device included in the information processing apparatus 10. The processing unit 12 is, for example, a processor or an arithmetic circuit included in the information processing apparatus 10.

The storage unit 11 stores molecular information 2 about a target molecule targeted for computing its energy expectation value in the ground state. The molecular information 2 includes the number of orbitals, the number of electrons, the Hamiltonian, and the active space, for example.

The processing unit 12 computes the energy expectation value in the ground state of the molecule based on the molecular information 2 in coordination with a quantum computer 1. For example, the processing unit 12 determines an initial arrangement of electrons on a plurality of orbitals of the molecule. For example, in the case where a Hartree-Fock state is used as the initial state, the processing unit 12 determines the initial arrangement in which the electrons of the molecule are arranged on orbitals from the lower energy levels in ascending order. The orbitals that are occupied by the electrons in the initial arrangement (occupied orbitals) may be referred to as "first orbitals". In addition, the orbitals that are not occupied by any electrons in the initial arrangement (unoccupied orbitals) may be referred to as "second orbitals".

The processing unit 12 determines the same number of qubits as the number of orbitals to be the qubits used for the computation. The states of the individual qubits used for the computation each represents presence or absence of an electron occupying a corresponding one of the plurality of orbitals of the molecule. For example, the state of a qubit corresponding to an orbital on which an electron is placed is represented by $|1\rangle$, and the state of a qubit corresponding to an orbital on which no electron is placed is represented by $|0\rangle$.

In this connection, a qubit corresponding to a first orbital may be referred to as "first qubit", and a qubit corresponding to a second orbital may be referred to as "second qubit". The processing unit 12 creates, from a plurality of qubits, a plurality of qubit pairs, each of which is formed by combining a single first qubit and a single second qubit.

The processing unit 12 generates a quantum circuit 3 based on the plurality of qubit pairs. For example, the processing unit 12 generates a quantum circuit 3 including a circuit that applies predetermined two-qubit gates **4*a* to 4*j* to at least some of the plurality of qubit pairs. The two-qubit gates 4*a* to 4*j*** are each a quantum gate that generates, based on the value of a parameter, a superposition state of a first state in which the state of a first qubit and the state of a second qubit have not been switched and a second state in which the state of the first qubit and the state of the second qubit have been switched.

In the case where the electrons are in the initial arrangement, a first qubit represents $|1\rangle$ and a second qubit represents $|0\rangle$ in the first state. In the second state in which the state of a first qubit and the state of a second qubit have been switched, the first qubit represents $|0\rangle$, and the second qubit represents $|1\rangle$. The transition of the first qubit and the second qubit from the first state to the second state represents that an electron present on the first orbital has been excited and moved to the second orbital. The probability of the first state and the probability of the second state depend on, for example, the value of the parameter of a corresponding one of the two-qubit gates **4*a* to 4*j*. Parameters of the two-qubit gates 4*a* to 4*j*** are independent of each other.

The circuit that applies the two-qubit gates **4*a* to 4*j* to at least some of the plurality of qubit pairs is an ansatz circuit 3*a*** that configures a trial state (also referred to as "trial wave function" or "ansatz") of the variational method.

The processing unit 12 acquires the energy expectation value in the ground state of the molecule by causing the quantum computer 1 to iteratively execute the quantum circuit while updating the values of the parameters of the two-qubit gates **4*a* to 4*j*. For example, the processing unit 12 computes the energy expectation value in the ground state of the molecule based on VQE in coordination with the quantum computer 1**.

According to the quantum computation control method as described above, in the quantum circuit 3, the two-qubit gates 4*a* to 4*j* are arranged for qubit pairs, each of which is formed by a first qubit corresponding to a first orbital on which an electron is present in the initial arrangement and a second qubit corresponding to a second orbital on which an electron is not present in the initial arrangement. In other words, no two-qubit gate that generates a superposition state is arranged for a pair of first qubits or a pair of second qubits. Each first qubit corresponds to a first orbital on which an electron is present, and no changes occur even if the state of a first qubit and the state of another first qubit are switched. Similarly, each second qubit corresponds to a second orbital on which no electron is present, and no changes occur even if the state of a second qubit and the state of another second qubit are switched. Thus, even if a two-qubit gate that generates a superposition state is not applied to a pair of first qubits or a pair of second qubits, the computation accuracy of the energy expectation value does not deteriorate. In addition, because unnecessary gate operations are reduced and the number of parameters to be updated is decreased, the processing unit 12 is able to efficiently execute the computation of the energy expectation value in the ground state of the molecule.

In addition, the processing unit 12 may apply a two-qubit gate that generates a superposition state only to the qubit pairs having a high effect on dropping the energy expectation value, among the plurality of qubit pairs. For example, the processing unit 12 computes, for each of the plurality of qubit pairs, an evaluation value about the effect on dropping the energy expectation value of the molecule through the application of a corresponding one of the two-qubit gates that generate a superposition state. Based on the evaluation values, the processing unit 12 determines qubit pairs to which a two-qubit gate that generates a superposition state is applied. For example, the processing unit 12 compares the evaluation value of a qubit pair with a predetermined threshold. In the case where the evaluation value is equal to or greater than the threshold or is equal to or less than the threshold, the processing unit 12 determines to apply the two-qubit gate that generates a superposition state to the qubit pair, and adds the two-qubit gate to the quantum circuit 3.

As described above, by applying a two-qubit gate that generates a superposition state only to the qubit pairs having a high effect on dropping the energy expectation value, it becomes possible to execute the process more efficiently while minimizing the deterioration of the accuracy of the energy expectation value.

It is possible to evaluate the effect on dropping the energy expectation value through the application of a two-qubit gate that generates a superposition state to a qubit pair, by using, for example, an ansatz circuit which only applies a two-qubit gate to the qubit pair. In this case, the processing unit 12 uses each of the plurality of qubit pairs as an evaluation target, and generates evaluation quantum circuits for the respective evaluation target qubit pairs. Each evaluation quantum circuit applies a two-qubit gate that generates a superposition state to a corresponding evaluation target qubit pair, and does not apply the two-qubit gate that generates a superposition state to any qubit pair that is not an evaluation target.

The processing unit 12 uses, as an evaluation value, a minimum energy expectation value obtained by causing the quantum computer 1 to iteratively execute an evaluation quantum circuit while updating the value of the parameter of the corresponding two-qubit gate applied. For example, in the case where the minimum energy expectation value obtained by applying a two-qubit gate that generates a superposition state to a qubit pair is equal to or less than a predetermined threshold, the processing unit 12 determines to apply the qubit gate to the qubit pair.

As described above, by executing the energy expectation value computation using ansatz circuits, each of which applies a two-qubit gate that generates a superposition state to a qubit pair, the processing unit 12 is able to correctly evaluate the effectiveness of the allocation of the two-qubit gates to the qubit pairs. As a result, in the quantum circuit 3, no two-qubit gates are arranged for qubit pairs having a low effect on dropping the energy expectation value, among the plurality of qubit pairs. As a result, the processing unit 12 is able to improve the computation efficiency of the energy expectation value while preventing deterioration of the accuracy of the energy expectation value.

It is also possible to evaluate the effect on dropping the energy expectation value through the application of a two-qubit gate that generates a superposition state to a qubit pair, for example, by using a derivative obtained by differentiating the energy expectation value with respect to the parameter of the two-qubit gate. For example, the processing unit 12 uses each of the plurality of qubit pairs as an evaluation target, and generates, for the respective evaluation target qubit pairs, evaluation quantum circuits, each of which applies a two-qubit gate that generates a superposition state only to a corresponding evaluation target qubit pair. By causing the quantum computer 1 to execute the evaluation quantum circuits, the processing unit 12 acquires the derivatives of the energy expectation values when the parameter of each two-qubit gate that generates a superposition state is a predetermined value. For example, as the predetermined value, a parameter value representing the Hartree-Fock state is set. The processing unit 12 uses each of the acquired derivatives as an evaluation value. For example, when the derivative obtained by applying a two-qubit gate that generates a superposition state to a qubit pair is equal to or greater than a predetermined threshold, the processing unit 12 adds the two-qubit gate applied to the qubit pair to the quantum circuit 3.

With the derivatives of the energy expectation values obtained by using ansatz circuits, each of which applies a two-qubit gate that generates a superposition state to a qubit pair, the processing unit 12 is able to correctly evaluate the effectiveness of the allocation of the two-qubit gates to the qubit pairs. Thus, no two-qubit gates are arranged for qubit pairs having a low effect on dropping the energy expectation value. As a result, the processing unit 12 is able to improve the computation efficiency of the energy expectation value while preventing deterioration of the accuracy of the energy expectation value. In addition, the load of computing the derivatives is less than the load of computing the minimum energy expectation values, and therefore, the processing unit 12 is able to efficiently compute the evaluation values.

The orbitals of a molecule are divided into those on which $\alpha$-spin electrons are placed and those on which $\beta$-spin electrons are placed. Depending on the computation target molecule, the number of $\alpha$-spin electrons and the number of $\beta$-spin electrons are maintained. In this case, the processing unit 12 may prevent the application of a two-qubit gate that generates a superposition state to a qubit pair corresponding to orbitals whose electrons spin in different directions.

For example, the processing unit 12 prevents creation of a qubit pair of a first qubit corresponding to a first orbital on which an $\alpha$-spin electron is placeable and a second qubit corresponding to a second orbital on which a $\beta$-spin electron is placeable. In addition, the processing unit 12 prevents creation of a qubit pair of a first qubit corresponding to a first orbital on which a β-spin electron is placeable and a second qubit corresponding to a second orbital on which an α-spin electron is placeable.

In this way, in the computation of an energy expectation value, unnecessary two-qubit gates are omitted, and the number of parameters is reduced. As a result, the processing unit 12 is able to efficiently compute the energy expectation value.

Second Embodiment

A second embodiment describes a quantum computation system that efficiently executes a VQE-based quantum chemical computation, without deteriorating the accuracy of this process, by applying a gate operation that generates a superposition state only to qubit pairs that are effective in improving the computation accuracy.

Figure 2:
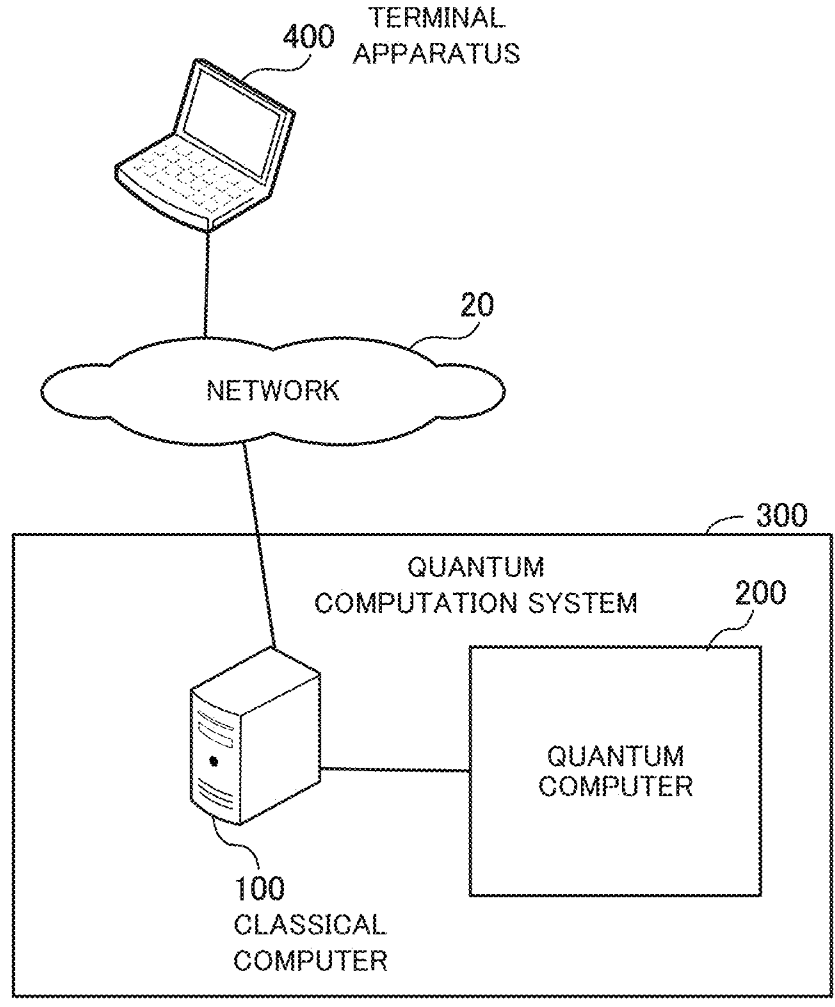
FIG. 2 illustrates an example of a configuration of a quantum computation system.

FIG. 2 illustrates an example of a configuration of a quantum computation system. A quantum computation system 300 is a computer system using a quantum device. The quantum computation system 300 includes a classical computer 100 and a quantum computer 200. The classical computer 100 is connected to a terminal apparatus 400 via a network 20. The terminal apparatus 400 is a computer used by a user who requests a quantum computation based on the quantum computation system 300. The classical computer 100 receives molecular information about a computation target molecule from the terminal apparatus 400.

The classical computer 100 generates a quantum circuit that computes the energy expectation value in the ground state of the computation target molecule based on the molecular information received from the terminal apparatus 400. The quantum circuit indicates the order of operations executed on qubits based on a configuration of elements such as quantum gates. A qubit is a bit capable of representing a superposition state of "0" and "1". The classical computer 100 instructs the quantum computer 200 to execute the quantum computation based on the quantum circuit. In addition, the classical computer 100 acquires the measurement result of each qubit from the quantum computer 200.

The quantum computer 200 includes a plurality of qubits and a device for operating each of the plurality of qubits. The plurality of qubits included in the quantum computer 200 may be realized by, for example, a superconducting method, an ion trap method, or a diamond spin method.

Figure 3:
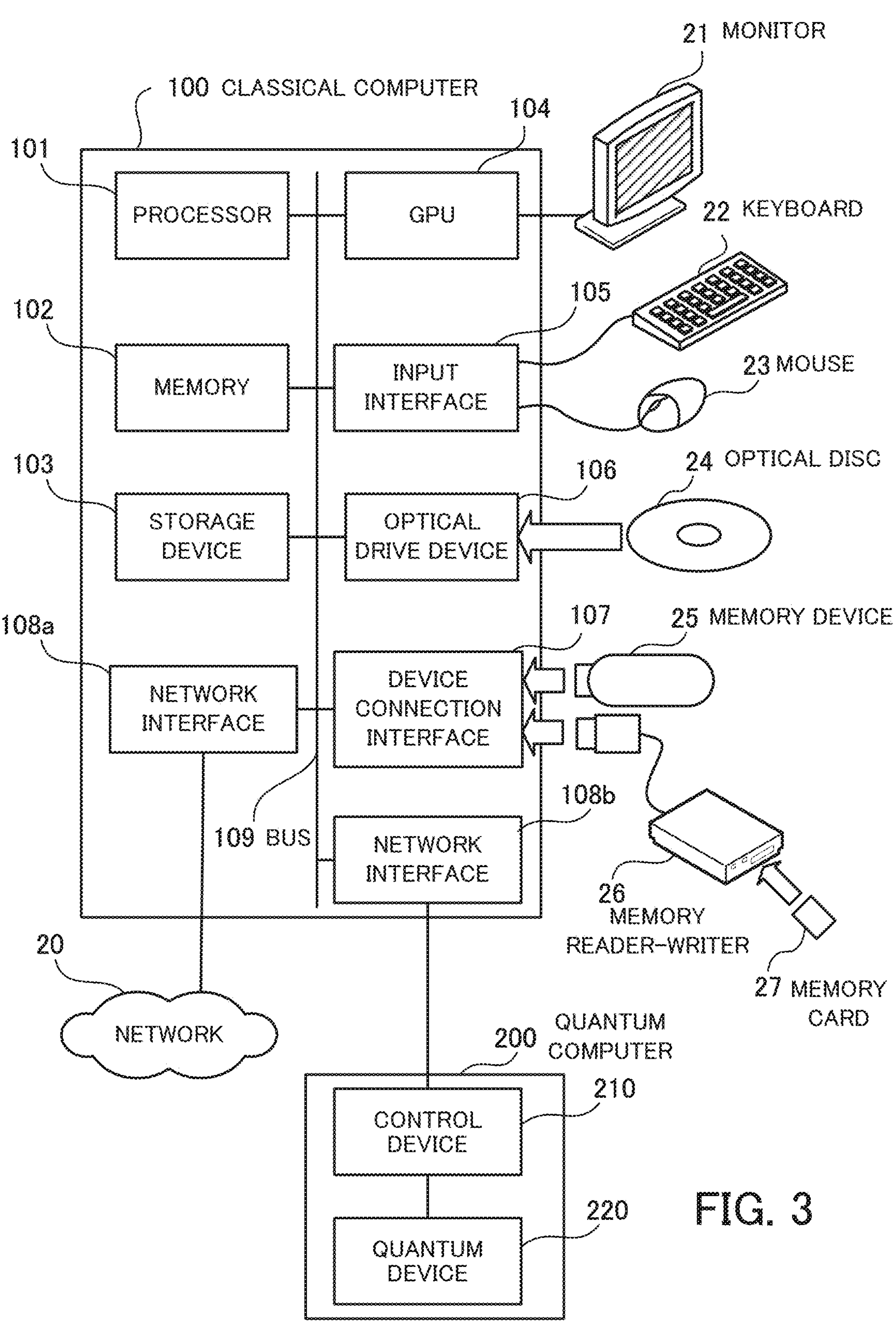
FIG. 3 illustrates an example of hardware of apparatuses included in the quantum computation system.

FIG. 3 illustrates an example of hardware of apparatuses included in the quantum computation system. The classical computer 100 is comprehensively controlled by a processor 101. The processor 101 is connected to a memory 102 and a plurality of peripheral devices via a bus 109. The classical computer 100 may be a multiprocessor system including a plurality of processors. A group of processors in the multiprocessor system may be referred to as "processor 101". The processor 101 may be referred to as "processor circuitry". Each of the plurality of processors is able to execute part of or all of the processes executed by the classical computer 100. If there are a plurality of processes that relate to each other, two or more of these processes may be executed by different processors. The processor 101 is, for example, a central processing unit (CPU), a micro processing unit (MPU), or a digital signal processor (DSP). At least part of the functions that are implemented by the processor 101 running a program may be realized by an electronic circuit, such as an application specific integrated circuit (ASIC) or a programmable logic device (PLD).

The memory 102 is used as a main storage device of the classical computer 100. The memory 102 temporarily stores the operating system (OS) programs or at least some of the application programs executed by processor 101. In addition, the memory 102 stores various kinds of data used by the processing of the processor 101. For example, a volatile semiconductor storage device such as a random access memory (RAM) is used as the memory 102.

Examples of the peripheral devices connected to the bus 109 include a storage device 103, a graphics processing unit (GPU) 104, an input interface 105, an optical drive device 106, a device connection interface 107, and network interfaces **108*a* and 108*b***.

The storage device 103 electrically or magnetically reads and writes data on its internal recording medium. The storage device 103 is used as an auxiliary storage device of the classical computer 100. The storage device 103 stores OS programs, application programs, and various kinds of data. For example, a hard disk drive (HDD) or a solid-state drive (SSD) may be used as the storage device 103.

The GPU 104 is an arithmetic device that executes image processing. The GPU 104 is an example of a graphic controller. The GPU 104 is connected to a monitor 21. The GPU 104 displays an image on the screen of the monitor 21 in accordance with a command from the processor 101. Examples of the monitor 21 include a display device using organic electroluminescence (EL) and a liquid crystal display device.

The input interface 105 is connected to a keyboard 22 and a mouse 23. The input interface 105 transmits a signal received from the keyboard 22 and the mouse 23 to the processor 101. The mouse 23 is an example of a pointing device, and a different pointing device may alternatively be used. Examples of the different pointing device include a touch panel, a tablet, a touchpad, and a trackball.

The optical drive device 106 uses laser light or the like, so as to read and write data on an optical disc 24. The optical disc 24 is a portable recording medium on which data has been recorded such that the data is readable by optical reflection. Examples of the optical disc 24 include a digital versatile disc (DVD), a DVD-RAM, a compact disc read-only memory (CD-ROM), a CD-recordable (CD-R), and a CD-rewritable (CD-RW).

The device connection interface 107 is a communication interface for connecting peripheral devices to the classical computer 100. For example, a memory device 25 and a memory reader-writer 26 are connectable to the device connection interface 107. The memory device 25 is a recording medium having a function of communicating with the device connection interface 107. The memory reader-writer 26 is a device that reads and writes data on a memory card 27. The memory card 27 is a card recording medium.

The network interface **108*a* is connected to the network 20. The network interface 108*a* exchanges data with another computer or communication device via the network 20. The network interface 108*a* is, for example, a wired communication interface connected to a wired communication device such as a switch or a router via a cable. Alternatively, the network interface 108*a*** may be a wireless communication interface connected to a wireless communication device such as a base station or an access point via radio waves.

The network interface **108*b* is an interface for connection to the quantum computer 200. The processor 101 transmits a quantum circuit to the quantum computer 200 via the network interface 108*b*, and instructs the quantum computer 200 to execute a quantum computation. In addition, the processor 101 acquires the result of the quantum computation via the network interface 108***b*.

The classical computer 100 is capable of realizing the processing functions according to the second embodiment by using the hardware described above. The information processing apparatus 10 according to the first embodiment may also be implemented by hardware similar to that of the classical computer 100 illustrated in FIG. 3.

The classical computer 100 realizes the processing functions according to the second embodiment by executing a program recorded in a computer-readable recording medium, for example. The program describing the processing contents to be executed by the classical computer 100 may be recorded in various recording media. For example, the program executed by the classical computer 100 may be stored in the storage device 103. The processor 101 loads at least part of a program from the storage device 103 into the memory 102, and executes the program. In addition, the program to be executed by the classical computer 100 may be recorded in a portable recording medium such as the optical disc 24, the memory device 25, or the memory card 27. For example, controlled by the processor 101, the program stored in a portable recording medium is first installed in the storage device 103, and then becomes executable. The processor 101 may directly read out the program from the portable recording medium and may execute the program.

The quantum computer 200 includes a control device 210 and a quantum device 220. The control device 210 executes gate operations on qubits in the quantum device 220 based on a quantum circuit. The quantum device 220 includes a plurality of qubits. The quantum device 220 is, for example, one or a plurality of quantum processing units (QPUs).

A VQE-based quantum chemical computation is efficiently executed by the above-described quantum computation system 300. In the VQE-based quantum chemical computation, first, a trial state is configured. The quantum computation system 300 efficiently executes the VQE-based quantum chemical computation by improving the function form in the trial state.

A UCC ansatz, which is one of the function forms in the trial state, creates various excited states, and a superposition state of a Hartree-Fock state and an excited state is used as the trial state.

The Hartree-Fock state is an energy ground state in which there is no superposition. For example, in the case of a molecule in which the number of orbitals is 6 and the number of electrons is 4, if there is no superposition, electrons are arranged in the four orbitals with the lower energy among the six orbitals, and such a state is the energy ground state. Assuming that a qubit having a smaller number is allocated to an orbital having a lower energy and assuming that presence or absence of an electron occupying an orbital is expressed by a corresponding qubit, the Hartree-Fock state is |111100>.

An excited state is created by using a creation operator at and an annihilation operator a.

Figure 4:
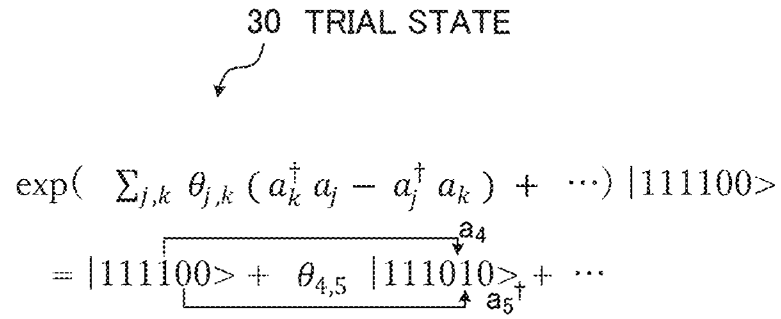
FIG. 4 illustrates an example of a UCC ansatz.

FIG. 4 illustrates an example of a UCC ansatz. A trial state 30 based on the UCC ansatz is expressed by Equation (1).

$$\exp\left(\sum_{j,k}\theta_{j,k}\left(a_k^\dagger a_j - a_j^\dagger a_k\right) + \cdots\right)|111100> = |111100> + \theta_{4,5}|111010> + \cdots \quad (1)$$

Equation (1) is an operation in which "$\exp(\Sigma_{j,k}\theta_{j,k}(a_k^\dagger a_j - a_j^\dagger a_k) + \ldots)$" is applied to the Hartree-Fock state |111100>. In Equation (1), j is the number of a qubit corresponding to an orbital from which an electron is annihilated, and k is the number of a qubit corresponding to an orbital on which an electron is created. The annihilation operator that annihilates an electron from an orbital corresponding to a fourth qubit is "$a_4$". In addition, the creation operator that creates an electron on an orbital corresponding to a fifth qubit is "$a_5^\dagger$". |111010> is obtained by applying "$a_4$" and "$a_5^\dagger$" to the Hartree-Fock state.

In Equation (1), $\theta_{j,k}$ is a parameter relating to the probability of the occurrence of an excited state in which an electron has been annihilated from an orbital corresponding a j-th qubit and an electron has been created on an orbital corresponding to a k-th qubit.

For example, the UCC ansatz is designed based on a physical interpretation of from which orbital and to which orbital an electron is excited. If all the assumable excited states are superposed with the Hartree-Fock state, the number of quantum gates becomes excessive. Thus, a symmetry-preserving ansatz may be considered as an alternative.

In the symmetry-preserving ansatz, operations "A" realized with fewer quantum gates is used to generate a superposition state of a Hartree-Fock state and an excited state.

Figure 5:
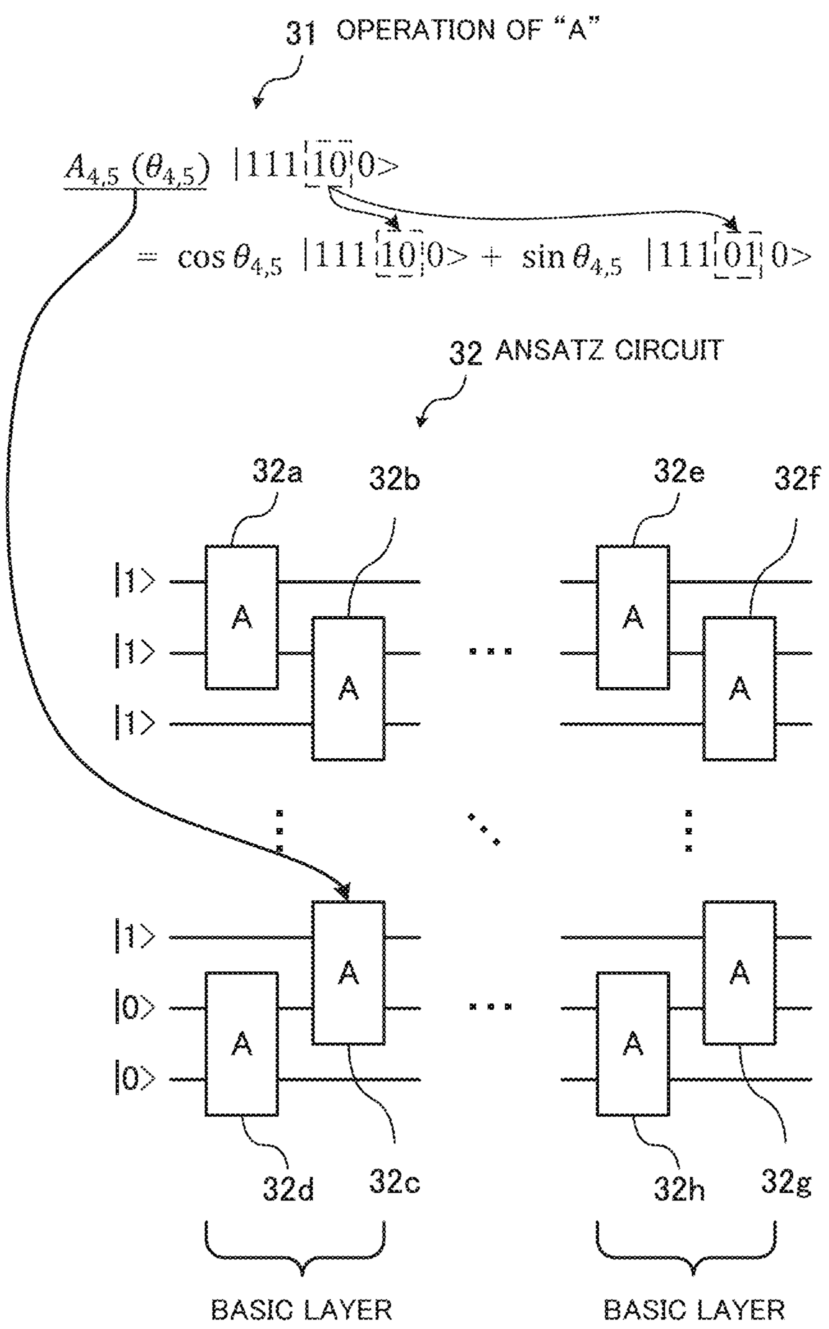
FIG. 5 illustrates an example of a symmetry-preserving ansatz.

FIG. 5 illustrates an example of a symmetry-preserving ansatz. An operation of annihilating an electron from an orbital corresponding to a j-th qubit and creating an electron on an orbital corresponding to a k-th qubit is expressed as "$A_{j,k}$". For example, an operation 31 of "A" for annihilating an electron from an orbital corresponding to a fourth qubit and creating an electron on an orbital corresponding to a fifth qubit on the Hartree-Fock state |111100> is expressed by Equation (2).

$$A_{4,5}(\theta_{4,5})|111100> = \cos\theta_{4,5}|111100> + \sin\theta_{4,5}|111010> \quad (2)$$

Assume that the quantum gates that execute a gate operation corresponding to the operation as described above are quantum gate boxAs 32*a* to 32*h*. The quantum gate boxAs 32*a* to 32*h* are each an example of the two-qubit gate that generates a superposition state described in the first embodiment.

In an ansatz circuit 32, an individual quantum gate boxA located between adjacent quantum circuits executes a gate operation that generates a superposition state.

The operation of a quantum gate boxA is expressed by a matrix having |00>, |01>, |10>, |11> as the basis, as expressed by Equation (3).

$$A(\theta, \phi) = \begin{pmatrix} 1 & 0 & 0 & 0 \\ 0 & \cos\theta & e^{i\phi}\sin\theta & 0 \\ 0 & e^{-i\phi}\sin\theta & -\cos\theta & 0 \\ 0 & 0 & 0 & 1 \end{pmatrix} \quad (3)$$

Equation (3) includes a parameter φ, and the value of the parameter φ may be "0" (φ=0). The parameter θ of each of the plurality of quantum gate boxAs is independent of the others, and if all the parameters θ are "θ=0", the Hartree-Fock state, which is the initial state, is maintained.

The ansatz circuit 32 is a circuit designed by giving priority to the ease of the computation in the quantum computer. For example, a quantum gate boxA performs a gate operation without changing the number of electrons with a relatively simple circuit. In addition, because the implementation of the ansatz circuit 32 is easy, the gate operation of a quantum gate boxA is applied only to adjacent qubits.

Although the implementation of the ansatz circuit 32 is easier than the implementation of a UCC ansatz, in order to obtain an accurate result, the gate operation of a quantum gate boxA needs to be iterated many times.

For example, assume that a group of quantum circuits, each of which applies a quantum gate boxA to a pair of adjacent qubits, is a single basic layer. In the ansatz circuit 32, a group of quantum gate boxAs 32*a* to 32*d* and a group of quantum gate boxAs 32*e* to 32*h* are each a basic layer.

In a single basic layer, only the states of each pair of adjacent qubits are superposed. Thus, to superpose the states of two qubits that are not adjacent to each other, the gate operations in a basic layer need to be iterated a plurality of times. By increasing the number of stages of basic layers, the computation accuracy of the VQE is improved.

However, if the number of stages of basic layers is increased, the ansatz circuit 32 extends, and the number of parameters θ optimized in the VQE increases. If the circuit extends, the processing time of a single VQE quantum computation by the quantum computer also extends. In addition, if the number of parameters θ increases, it takes more time for the VQE computation result to converge, and the number of VQE iterative computations increases. As a result, the overall VQE-based quantum chemical computation is extended.

Thus, the quantum computation system 300 configures a trial state by using an ansatz circuit including fewer quantum gate boxAs without deteriorating the accuracy as much as possible. By reducing the number of quantum gate boxAs to be executed, the number of parameters θ optimized during the VQE computation is reduced. If the number of parameters θ is reduced, it becomes easier to execute the computation for updating the parameters θ. In addition, by reducing the depth of the circuit, time is shortened for a single quantum computation.

Specifically, the quantum computation system 300 generates an ansatz in which the gate operation of a quantum gate boxA is applied only to the qubit pairs of a qubit in one initial state and a qubit in another initial state, among all the qubit pairs generatable by selecting two qubits.

Figure 6:
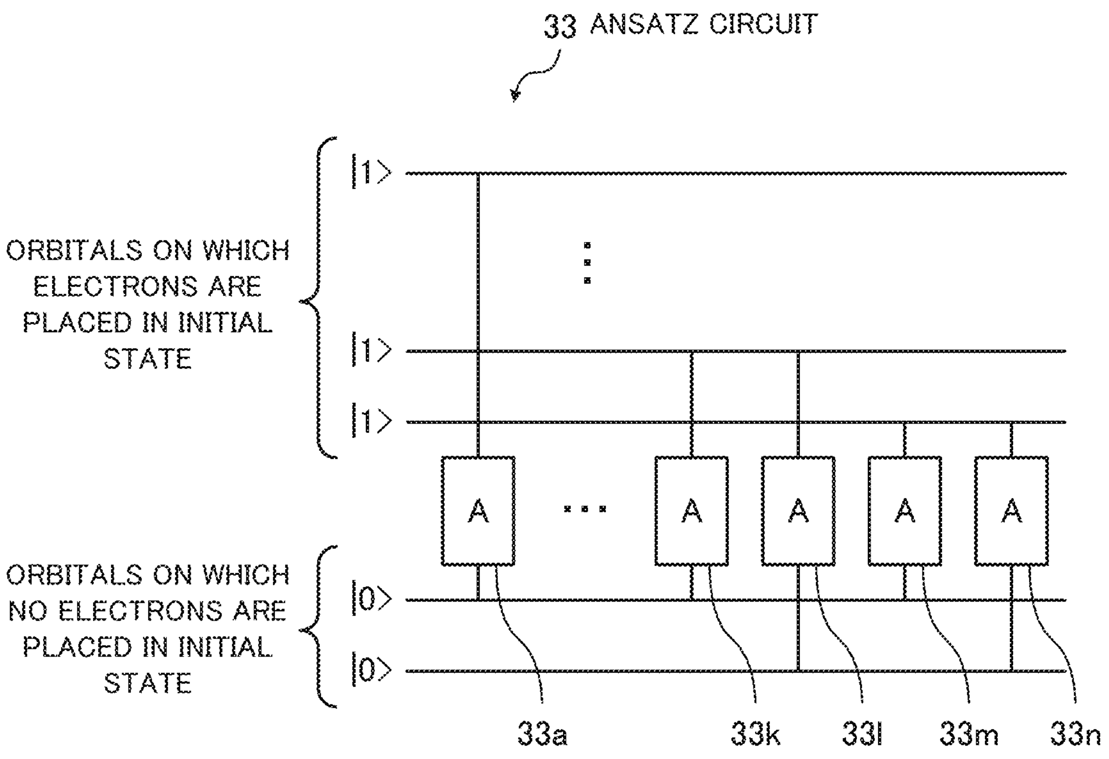
FIG. 6 illustrates an example of an ansatz circuit having fewer quantum gate boxAs.

FIG. 6 illustrates an example of an ansatz circuit having fewer quantum gate boxAs. As illustrated in FIG. 6, there are qubits whose initial state is |1> and qubits whose initial state is |0>. The qubits whose initial state is |1> correspond to orbitals (occupied orbitals) on which electrons are placed in the initial state. The qubits whose initial state is |0> correspond to orbitals (unoccupied orbitals) on which no electrons are placed in the initial state.

The following description assumes that a qubit having a smaller qubit number (a qubit that is set as a higher level in a quantum circuit) is associated with an orbital having a lower energy. If the initial state is a Hartree-Fock state, the initial state of a predetermined number of qubits starting from one with the smallest qubit number in ascending order (the number of electrons placed) indicates |1>, and the initial state of the other qubits indicates |0>.

An ansatz circuit 33 that configures a trial state proposed in the second embodiment applies the gate operation of a quantum gate boxA to each qubit pair corresponding to an occupied orbital and an unoccupied orbital. That is, the ansatz circuit 33 includes quantum gate boxAs 33*a*, . . . , 33*k*, 33*l*, 33*m*, and 33*n* for the pairs, each of which is formed by a qubit whose initial state is |1> and a qubit whose initial state is |0>. In other words, in the ansatz circuit 33, the gate operation of a quantum gate boxA is not applied to a pair of qubits both having the initial state |1> or to a pair of qubits both having the initial state |0>.

In the case where two qubits both have the initial state |1> or |0>, the state does not change by applying a quantum gate boxA to them. Thus, applying the gate operation of a quantum gate boxA to these qubit pairs is an unnecessary operation. In the quantum computation system 300, by preventing execution of quantum gate boxAs that execute these unnecessary operations, the efficiency of the VQE-based quantum chemical computation is improved. That is, because the gate operations of unnecessary quantum gate boxAs are prevented, the total number of quantum gate boxAs is reduced. In this way, the ansatz circuit 33 is shortened, and the number of parameters θ to be optimized is reduced. As a result, the VQE-based computation is executed efficiently.

Figure 7:
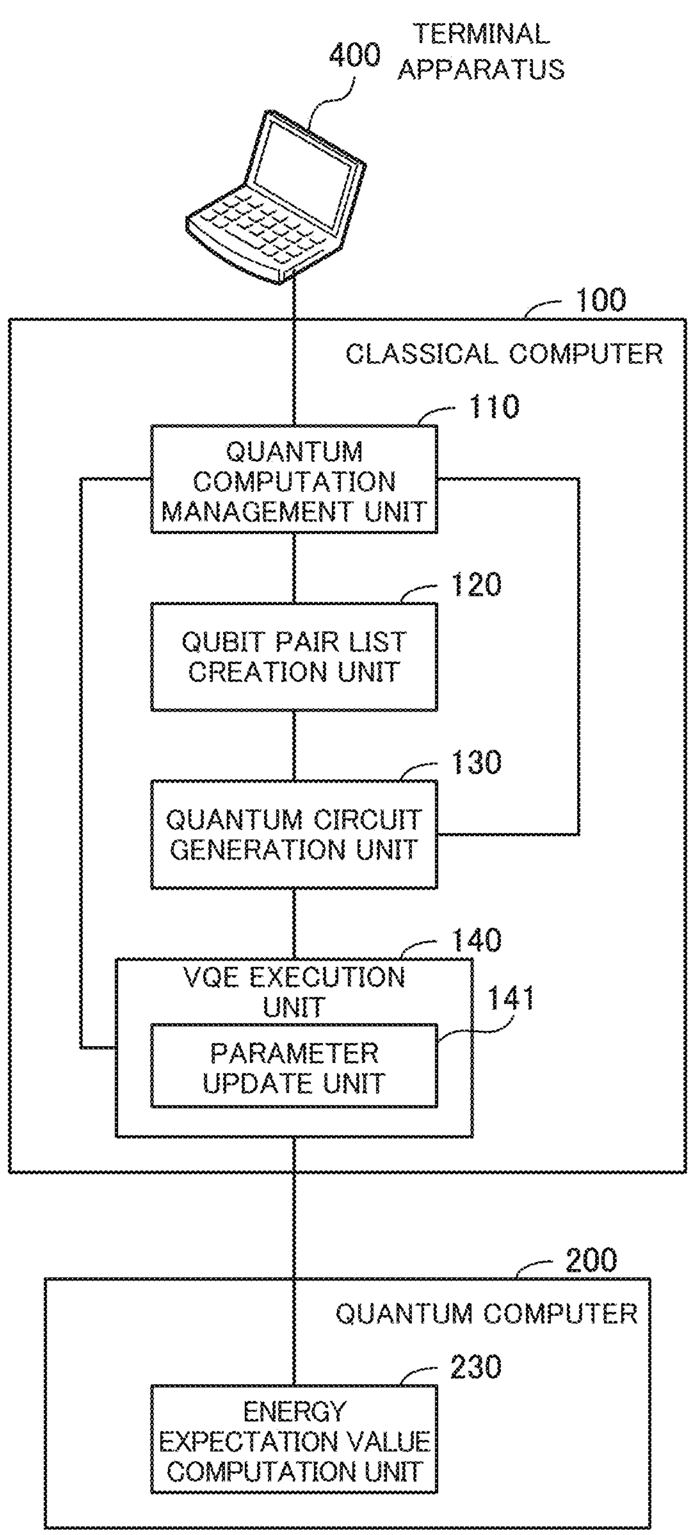
FIG. 7 is a block diagram illustrating a functional example of a classical computer for executing a quantum chemical computation.

FIG. 7 is a block diagram illustrating a functional example of the classical computer for executing a quantum chemical computation. To execute a quantum chemical computation, the classical computer 100 includes a quantum computation management unit 110, a qubit pair list creation unit 120, a quantum circuit generation unit 130, and a VQE execution unit 140.

The quantum computation management unit 110 receives a VQE computation request from the terminal apparatus 400, for example. The quantum computation management unit 110 transmits molecular information about a computation target molecule indicated in the computation request to the qubit pair list creation unit 120 and the quantum circuit generation unit 130. In addition, the quantum computation management unit 110 acquires a VQE result from the VQE execution unit 140, and transmits the VQE computation result to the terminal apparatus 400.

The qubit pair list creation unit 120 determines qubit pairs to which the gate operation of a quantum gate boxA is applied, based on the molecular information about the computation target molecule, and creates a qubit pair list of the determined qubit pairs. For example, the qubit pair list creation unit 120 creates a qubit pair list of all the qubit pairs, each of which is a qubit corresponding to an occupied orbital and a qubit corresponding to an unoccupied orbital in the Hartree-Fock state. The qubit pair list creation unit 120 transmits the created qubit pair list to the quantum circuit generation unit 130.

Based on the molecular information about the computation target molecule, the quantum circuit generation unit 130 generates a quantum circuit for computing the solution of the problem with the VQE. For example, the quantum circuit generation unit 130 generates a quantum circuit including an ansatz circuit in which the gate operation of a quantum gate boxA is applied to the qubit pairs included in the qubit pair list. The quantum circuit generation unit 130 transmits the generated quantum circuit to the VQE execution unit 140.

The VQE execution unit 140 executes the VQE based on the acquired quantum circuit in coordination with the quantum computer 200. To execute the VQE, the VQE execution unit 140 includes a parameter update unit 141 that optimizes the parameters θ used in the VQE.

For example, first, the VQE execution unit 140 specifies an initial value for the parameters θ, and instructs the quantum computer 200 to execute the quantum circuit based on the parameters θ. The VQE execution unit 140 obtains an energy expectation value as the execution result of the quantum circuit. After acquiring the energy expectation value, the parameter update unit 141 updates the parameters θ such that the energy expectation value drops. The VQE execution unit 140 instructs the quantum computer 200 to execute the quantum circuit based on the updated parameters θ.

The VQE execution unit 140 iterates the updating of the parameters θ and the execution of the quantum circuit based on the updated parameters θ until the energy expectation value converges. When the energy expectation value converges, the VQE execution unit 140 transmits the values of the parameters θ and the energy expectation value to the quantum computation management unit 110 as the VQE computation result.

The quantum computer 200 includes an energy expectation value computation unit 230. The energy expectation value computation unit 230 executes, based on the quantum circuit that is input from the classical computer 100, the gate operations on the qubits, and measures the final qubit state. Next, the energy expectation value computation unit 230 computes an energy expectation value from the measurement result, and transmits the computed energy expectation value to the classical computer 100. This process of computing the energy expectation value from the measurement result may be executed by the VQE execution unit 140 of the classical computer 100.

The functions of the elements in the classical computer 100 illustrated in FIG. 7 may be realized by, for example, causing the processor 101 to execute the program modules corresponding to the elements.

The classical computer 100 having the functions illustrated in FIG. 7 executes a VQE-based quantum chemical computation while controlling the quantum computer 200. Hereinafter, a processing procedure of the quantum chemical computation will be described with reference to FIGS. 8 and 9.

Figure 8:
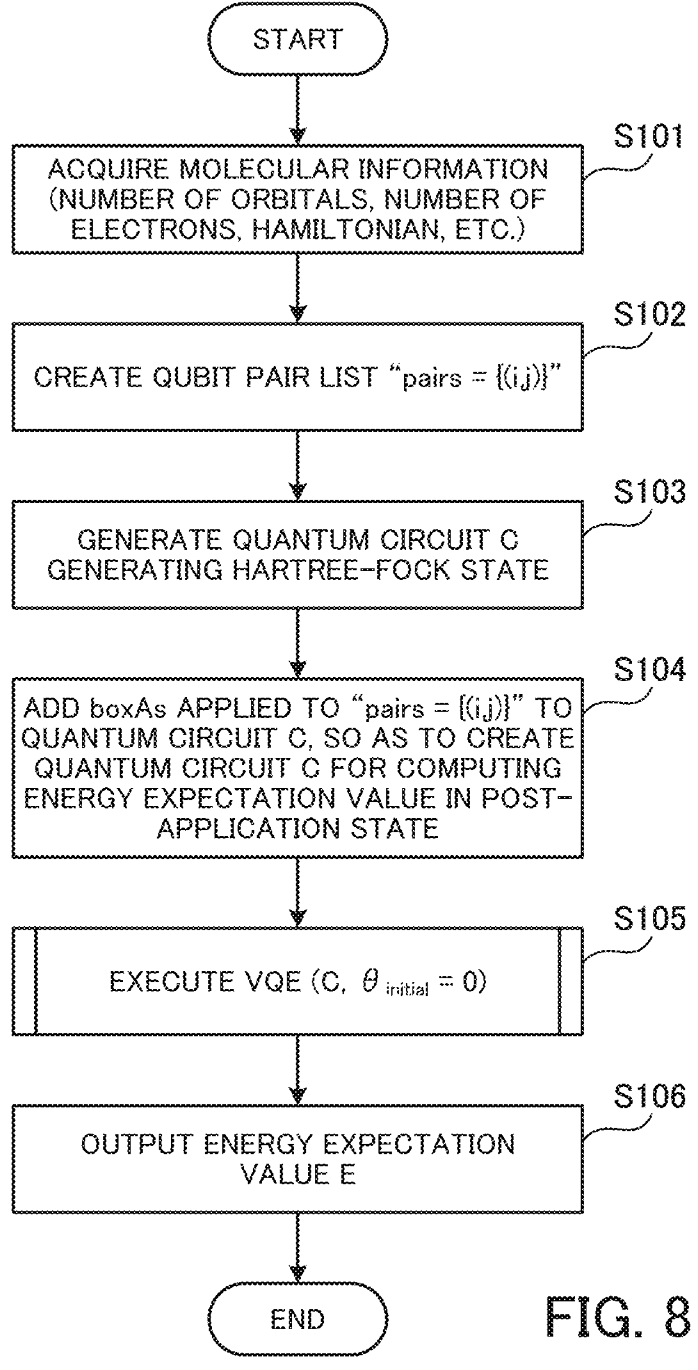
FIG. 8 is a flowchart illustrating an example of a procedure of the quantum chemical computation.

FIG. 8 is a flowchart illustrating an example of a procedure of the quantum chemical computation. Hereinafter, the process illustrated in FIG. 8 will be described in accordance with the order of the step numbers.

[Step S101] The quantum computation management unit 110 acquires molecular information about a computation target molecule from the terminal apparatus 400. The molecular information includes the number of orbitals of the molecule whose energy in the ground state is to be computed, the number of electrons of the molecule, the Hamiltonian indicating the energy of the molecule, and the active space, for example.

[Step S102] The qubit pair list creation unit 120 determines qubit pairs to which the gate operation of a quantum gate boxA is applied in the VQE, and creates a qubit pair list indicating the determined qubit pairs. For example, the qubit pair list creation unit 120 determines a group of all pairs (i,j), where i denotes a number of a qubit corresponding to an occupied orbital and j denotes a number of a qubit corresponding to an unoccupied orbital, so as to create the qubit pair list "pairs={(i,j)}".

The electrons on the orbitals of the molecule are classified into α-spin electrons and β-spin electrons according to the spin direction. The α spin is also referred to as "upward spin". The β spin is also referred to as "downward spin". A single molecular orbital is able to hold a maximum of two electrons. If two electrons are held, one is an α-spin electron, and the other is a β-spin electron. In this connection, one orbital is defined as an orbital for α spin and an orbital for β spin, and a qubit indicating presence or absence of an α-spin electron or a qubit indicating presence or absence of a β-spin electron are associated with each orbital.

In many problems in quantum chemical computation, the number of α-spin electrons and the number of β-spin electrons are maintained. Thus, the qubit pair list creation unit 120 may determine qubit pairs corresponding to α spin or qubit pairs corresponding to β spin as the operation target qubit pairs. This prevents the gate operation of a quantum gate boxA to be applied to a pair of a qubit corresponding to α spin and a qubit corresponding to β spin. That is, the number of quantum gate boxAs to be applied is reduced.

[Step S103] The quantum circuit generation unit 130 generates a quantum circuit C that generates a Hartree-Fock state.

[Step S104] The quantum circuit generation unit 130 adds the quantum gate boxAs applied to all the qubit pairs indicated by the qubit pair list "pairs={(i,j)}" to the quantum circuit C, so as to create a quantum circuit C for computing the energy expectation value in the post-application state.

[Step S105] In coordination with the quantum computer 200, the VQE execution unit 140 executes the VQE for obtaining a trial state $|\Psi(\theta)>$ that minimizes the energy expectation value $<\Psi(\theta)|H|\Psi(\theta)>$ based on the quantum circuit C. The VQE execution unit 140 sets an initial value $\theta_{initial}$ for the individual parameter θ used in the VQE to "0". The VQE execution process will be described in detail below (see FIG. 9). Upon completion of the VQE, the VQE execution unit 140 transmits the energy expectation value E obtained from the VQE result to the quantum computation management unit 110.

[Step S106] The quantum computation management unit 110 outputs the energy expectation value E. For example, the quantum computation management unit 110 transmits the energy expectation value E as the execution result of the VQE-based quantum chemical computation to the terminal apparatus 400.

Next, the VQE execution process will be described in detail.

Figure 9:
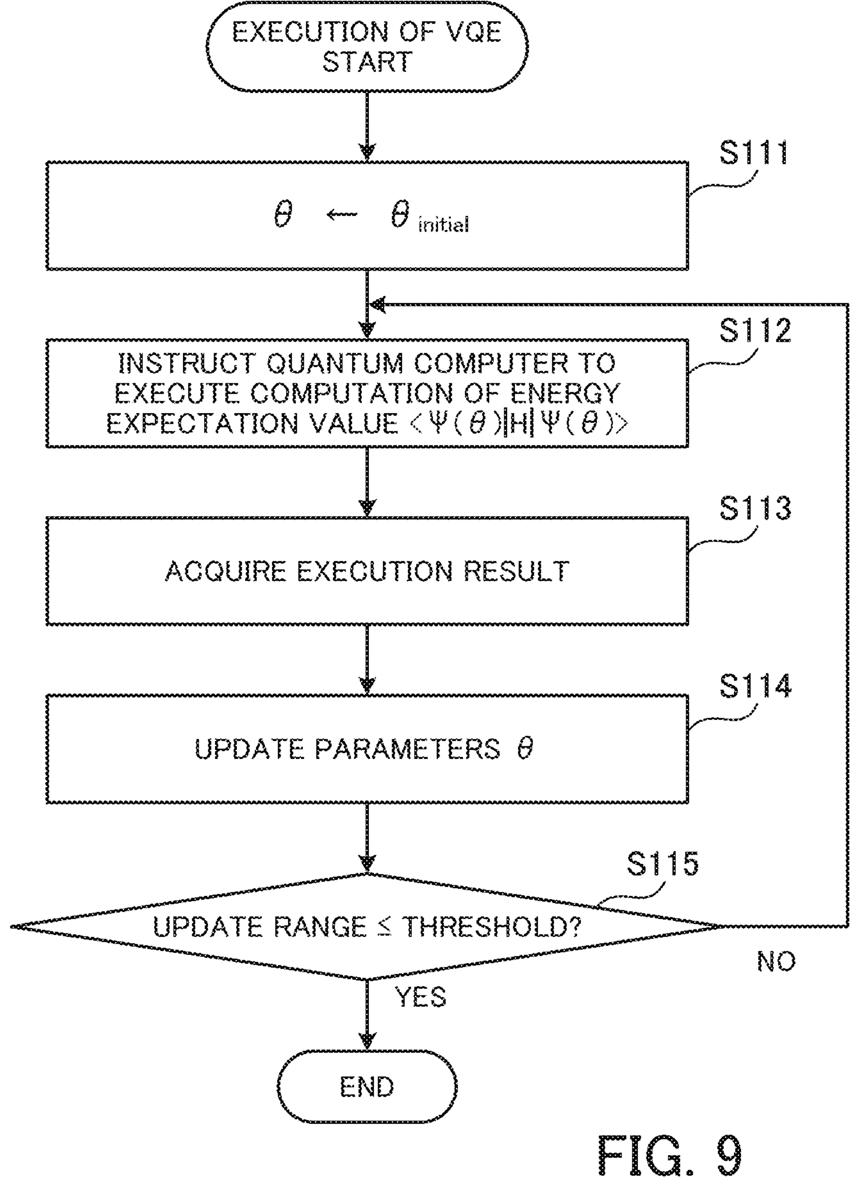
FIG. 9 is a flowchart illustrating an example of a procedure of a VQE execution process.

FIG. 9 is a flowchart illustrating an example of a procedure of the VQE execution process. Hereinafter, the process illustrated in FIG. 9 will be described in accordance with the order of the step numbers.

[Step S111] The VQE execution unit 140 sets the initial value "$\theta_{initial}$" to the parameters θ. The parameters θ are independently set for the quantum gate boxAs of the quantum circuit. Thus, the parameters θ are vector data including as many elements ($\theta_1$, $\theta_2$, . . . ) as the quantum gate boxAs. Regarding the initial value "$\theta_{initial}$" indicating the Hartree-Fock state, the values of all the elements are "0".

[Step S112] The VQE execution unit 140 transmits the quantum circuit C to the quantum computer 200, and instructs the quantum computer 200 to execute the computation of the energy expectation value $<\Psi(\theta)|H|\Psi(\theta)>$ in the trial state.

[Step S113] The VQE execution unit 140 acquires the energy expectation value from the quantum computer 200 as the execution result.

[Step S114] The VQE execution unit 140 updates the parameters θ such that the energy expectation value is minimized, by using a gradient method or the like. The parameters θ may be updated by using another method other than a gradient method.

[Step S115] The VQE execution unit 140 determines whether the change in parameter θ before and after the update (the update range) is equal to or less than a threshold. If the update range is equal to or less than the threshold, the VQE execution unit 140 ends the execution of the VQE. If the update range is greater than the threshold, the VQE execution unit 140 executes step S112, and iterates the computation of the energy expectation value with the updated parameters θ.

In the process described above, a smaller number of gate operations of quantum gate boxAs are executed, and therefore the VQE is executed efficiently. For example, whether the difference between the energy expectation value computed last and the one before the last is equal to or less than a threshold may be used as a termination condition of the VQE in step S115.

Next, a VQE-based computation example of a minimum energy value of a specific molecule will be described. In the following example, the ground state energy of a Mg surface system is computed with fourteen qubits.

Figure 10:
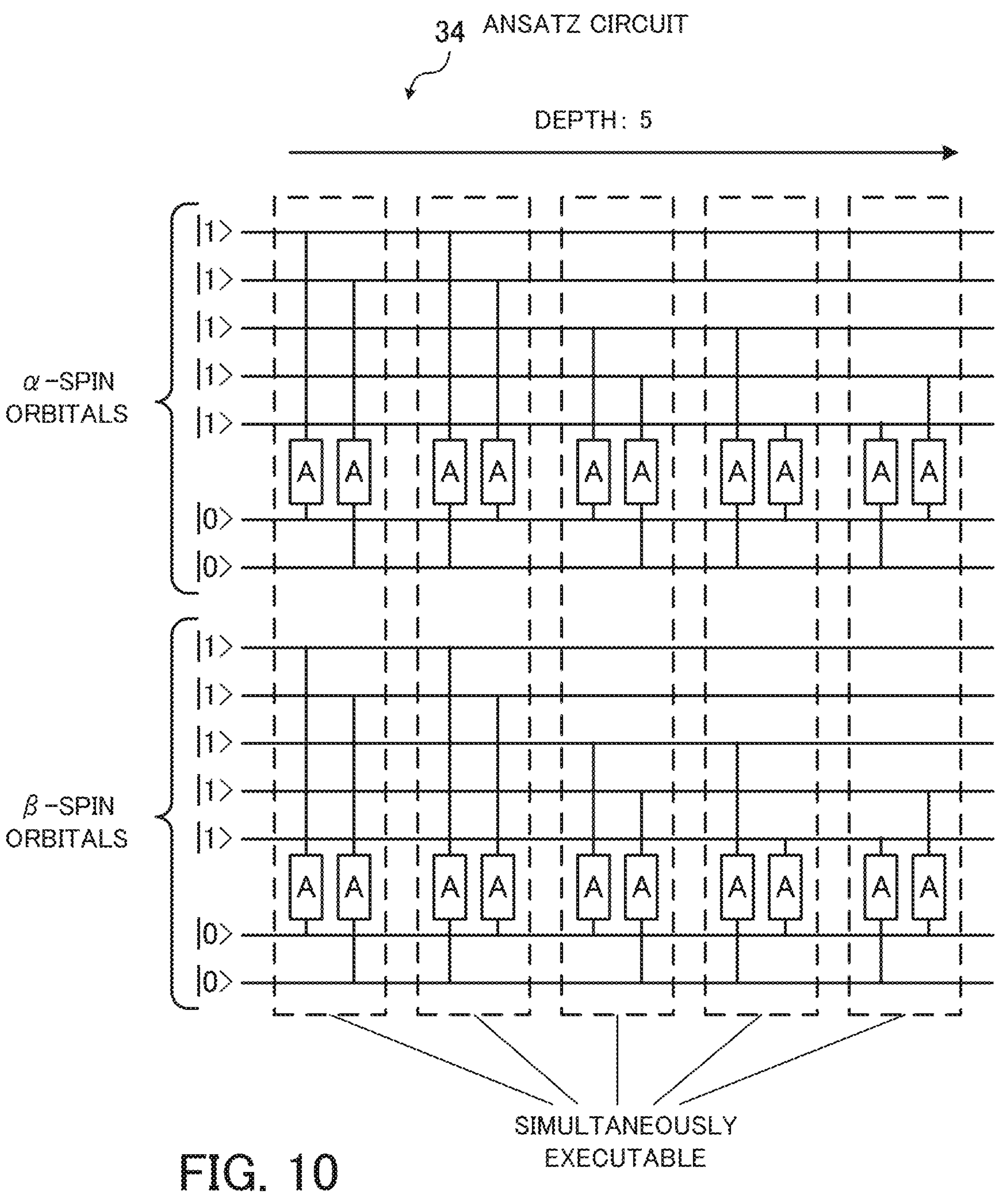
FIG. 10 illustrates an example of an ansatz circuit for VQE.

FIG. 10 illustrates an example of an ansatz circuit for the VQE. This ansatz circuit 34 includes gate operations applied to fourteen qubits. In the ansatz circuit 34, the input state is a Hartree-Fock state. In FIG. 10, the quantum gates for generating the Hartree-Fock state are omitted.

The fourteen qubits are divided into two groups, each of which includes seven qubits. The qubits belonging to one group are associated with seven orbitals on which α-spin electros are placed. The qubits belonging to the other group are associated with seven orbitals on which β-spin electrons are placed.

Because the number of electrons in the active space is ten, the five α-spin orbitals of the lower energy and the five β-spin orbitals of the lower energy are occupied orbitals in the Hartree-Fock state. The remaining orbitals are unoccupied orbitals. Thus, of all the orbitals on which the α-spin electrons are placed, the initial state of the qubits corresponding to the orbitals having the five lowest energies indicates |1>. In addition, of all the orbitals on which the β-spin electrons are placed, the initial state of the qubits corresponding to the orbitals having the five lowest energies indicates |1>. The initial state of the remaining qubits indicates |0>.

In the ansatz circuit 34, a quantum circuit that applies the gate operation of a quantum gate boxA is included for each pair of a qubit corresponding to an occupied orbital and a qubit corresponding to an unoccupied orbital, of all the seven qubits corresponding to the α-spin orbitals. In addition, in the ansatz circuit 34, a quantum gate boxA is included for each pair of a qubit corresponding to an occupied orbital and a qubit corresponding to an unoccupied orbital, of all the seven qubits corresponding to the β-spin orbitals.

As described above, there are ten quantum gate boxAs for the qubits corresponding to the α-spin orbitals, and there are ten quantum gate boxAs for the qubits corresponding to the β-spin orbitals. As long as the operation target qubits do not overlap, a plurality of quantum gate boxAs are executable simultaneously. In the ansatz circuit 34, four quantum gate boxAs are simultaneously executable. In FIG. 10, each group of simultaneously executable quantum gate boxAs is enclosed by a dashed rectangular line. Assuming that the depth of a single execution of quantum gate boxAs is "1", the depth of the ansatz circuit 34 is "5".

FIG. 11 illustrates examples of VQE execution results. FIG. 11 illustrates results, each of which has been obtained by computing the energy in the ground state of an Mg surface system based on the VQE. The number of qubits used is fourteen.

VQE execution results 41 according to a comparison example are results of the VQE in which a quantum gate boxA has been applied to each pair of adjacent qubits. Each of the VQE execution results 41 according to the comparison example has been obtained by using a different number of stages (layers) of basic layers (see FIG. 5) in which a quantum gate boxA is applied to each pair of adjacent qubits.

As indicated by the VQE execution results 41 according to the comparison example, when the number of layers is "1", the depth is "2", the number of quantum gate boxAs is "13", the number of parameters is "26", the number of iterations of the VQE until the energy expectation value converges is "16", the processing time is "1000", and the energy expectation value is "−30.6299". When the number of layers is "2", the depth is "4", the number of quantum gate boxAs is "26", the number of parameters is "52", the number of iterations of the VQE until the energy expectation value converges is "24", the processing time is "5000", and the energy expectation value is "−30.7026". When the number of layers is "3", the depth is "6", the number of quantum gate boxAs is "39", the number of parameters is "78", the number of iterations of the VQE until the energy expectation value converges is "27", the processing time is "13000", and the energy expectation value is "−30.7029".

As indicated by the VQE execution results 41 according to the comparison example, the accuracy of the energy expectation value obtained when the number of layers is "1" is insufficient. Thus, to obtain an accurate computation result, the number of layers needs to be "2" or greater.

A VQE execution result 42 according to the proposed technique is the execution result of the VQE obtained when a quantum gate boxA is applied to each qubit pair of a qubit corresponding to an occupied orbital and a qubit corresponding to an unoccupied orbital. In the example of the VQE execution result 42 according to the proposed technique, no quantum gate boxA is applied to a pair of a qubit corresponding to an α-spin orbital and a qubit corresponding to a β-spin orbital.

In the case of the proposed VQE, the number of occupied orbitals corresponding to the same spin is "5", the number of unoccupied orbitals corresponding to the same spin is "2", the depth is "5", the number of quantum gate boxAs is "20", and the number of parameters is "40". In addition, as indicated by the VQE execution result 42 according to the proposed technique, the number of iterations of the VQE until the energy expectation value converges is "10", the processing time is "2000", and the energy expectation value is "−30.7028".

The individual processing time indicated in FIG. 11 is obtained by "depth×(the number of parameters+1)×the number of iterations of the VQE". As illustrated in FIG. 11, compared with the VQE according to the comparison example in which the number of layers of is "2" or "3", the VQE according to the proposed technique is able to obtain an energy expectation value of approximately the same accuracy within a shorter processing time.

Third Embodiment

In a third embodiment, qubit pairs having a high effect on dropping the energy expectation value are selected from all the qubit pairs, each of which is formed by a qubit corresponding to an occupied orbital and a qubit corresponding to an unoccupied orbital, and a quantum gate boxA is applied to these selected qubit pairs.

For example, the classical computer selects these qubit pairs one by one. The classical computer executes the VQE by using an ansatz circuit that applies a quantum gate boxA to each selected qubit pair. Of all the qubit pairs, the classical computer acquires qubit pairs whose energy expectation value obtained by the VQE is equal to or greater than a threshold. The classical computer executes the VQE by using an ansatz circuit that applies a quantum gate boxA to each of the acquired qubit pairs.

Figure 12:
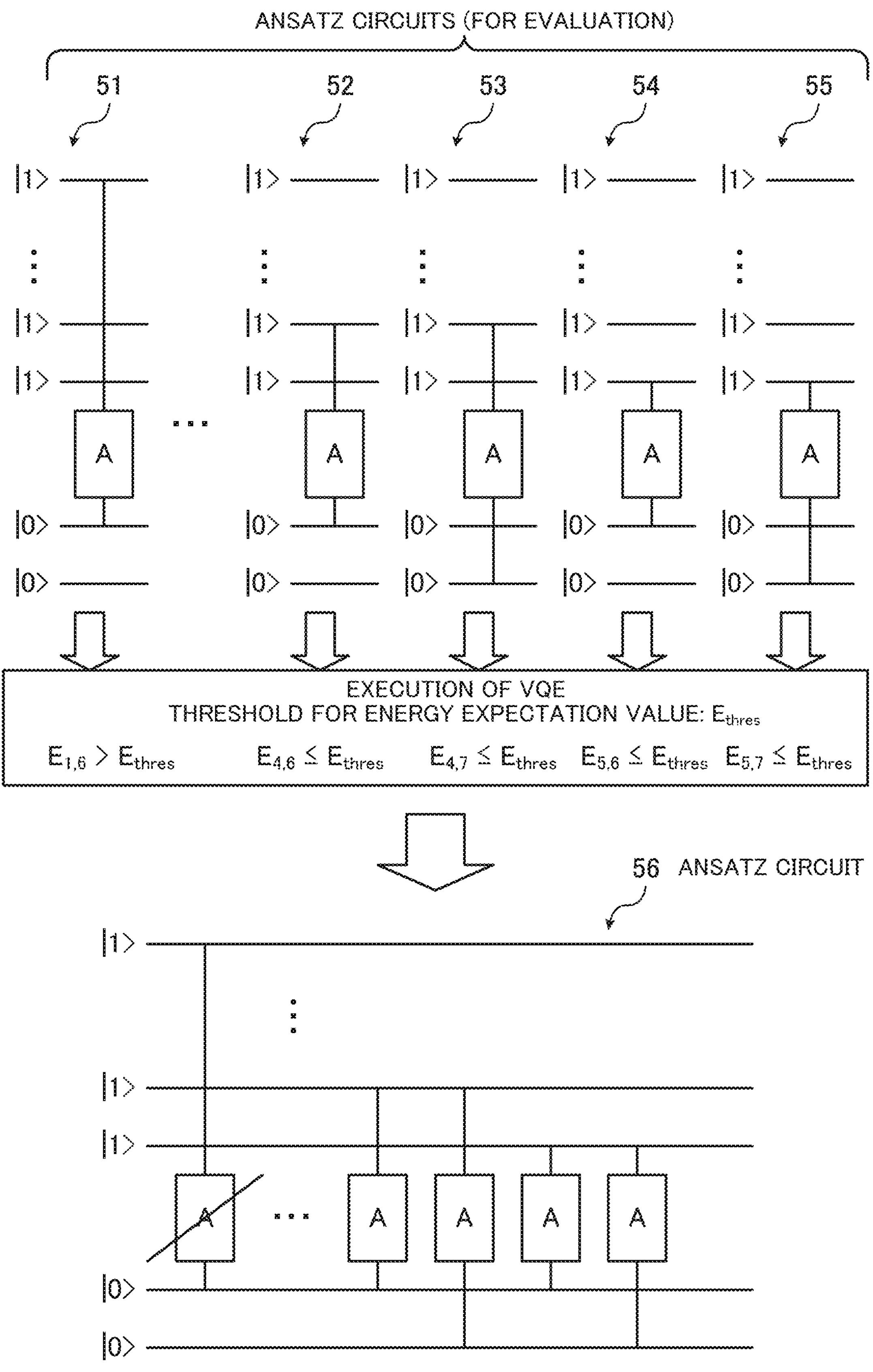
FIG. 12 illustrates a first example of an ansatz circuit that applies a quantum gate boxA only to qubit pairs having a high effect on dropping an energy expectation value.

FIG. 12 illustrates a first example of the ansatz circuit that applies a quantum gate boxA only to the qubit pairs having a high effect on dropping the energy expectation value. For example, assuming that five electrons are present on seven molecular orbitals, five of the seven qubits are associated with occupied orbitals in the Hartree-Fock state, and the other two qubits are associated with unoccupied orbitals in the Hartree-Fock state.

According to the third embodiment, to determine the qubit pairs having a high effect on dropping the energy expectation value, a plurality of evaluation ansatz circuits, each of which applies a quantum gate boxA only to a single qubit pair, are generated. For example, an ansatz circuit 51 applies a quantum gate boxA to a first qubit and a sixth qubit. An ansatz circuit 52 applies a quantum gate boxA to a fourth qubit and the sixth qubit. An ansatz circuit 53 applies a quantum gate boxA to the fourth qubit and a seventh qubit. An ansatz circuit 54 applies a quantum gate boxA to a fifth qubit and the sixth qubit. An ansatz circuit 55 applies a quantum gate boxA to the fifth qubit and the seventh qubit.

If the VQE is executed by using each of these ansatz circuits, the energy expectation values of these ansatz circuits are obtained. If the obtained energy expectation value is equal to or less than a threshold $E_{thres}$, the corresponding qubit pair to which the quantum gate boxA has been applied by the corresponding ansatz circuit used for the computation of the corresponding energy expectation value is determined to have a high effect on dropping the energy expectation value.

In the example in FIG. 12, regarding the qubit pair of the first qubit and the sixth qubit, the energy expectation value $E_{1,6}$ obtained by the VQE using the corresponding ansatz circuit 51 is greater than the threshold $E_{thres}$. Thus, the qubit pair of the first qubit and the sixth qubit is determined to have a low effect on dropping the energy expectation value through the application of the quantum gate boxA.

On the other hand, regarding the qubit pair of the fourth qubit and the sixth qubit, the energy expectation value $E_{4,6}$ obtained by the VQE using the corresponding ansatz circuit 52 is equal to or less than the threshold $E_{thres}$. Thus, the qubit pair of the fourth qubit and the sixth qubit is determined to have a high effect on dropping the energy expectation value through the application of the quantum gate boxA.

An ansatz circuit 56 is generated based on the determination results as described above. The ansatz circuit 56 applies a quantum gate boxA only to each qubit pair determined to have a high effect on dropping the energy expectation value. The VQE is executed by using the ansatz circuit 56. In this way, it is possible to reduce the number of quantum gate boxAs without deteriorating the computation accuracy.

Figure 13:
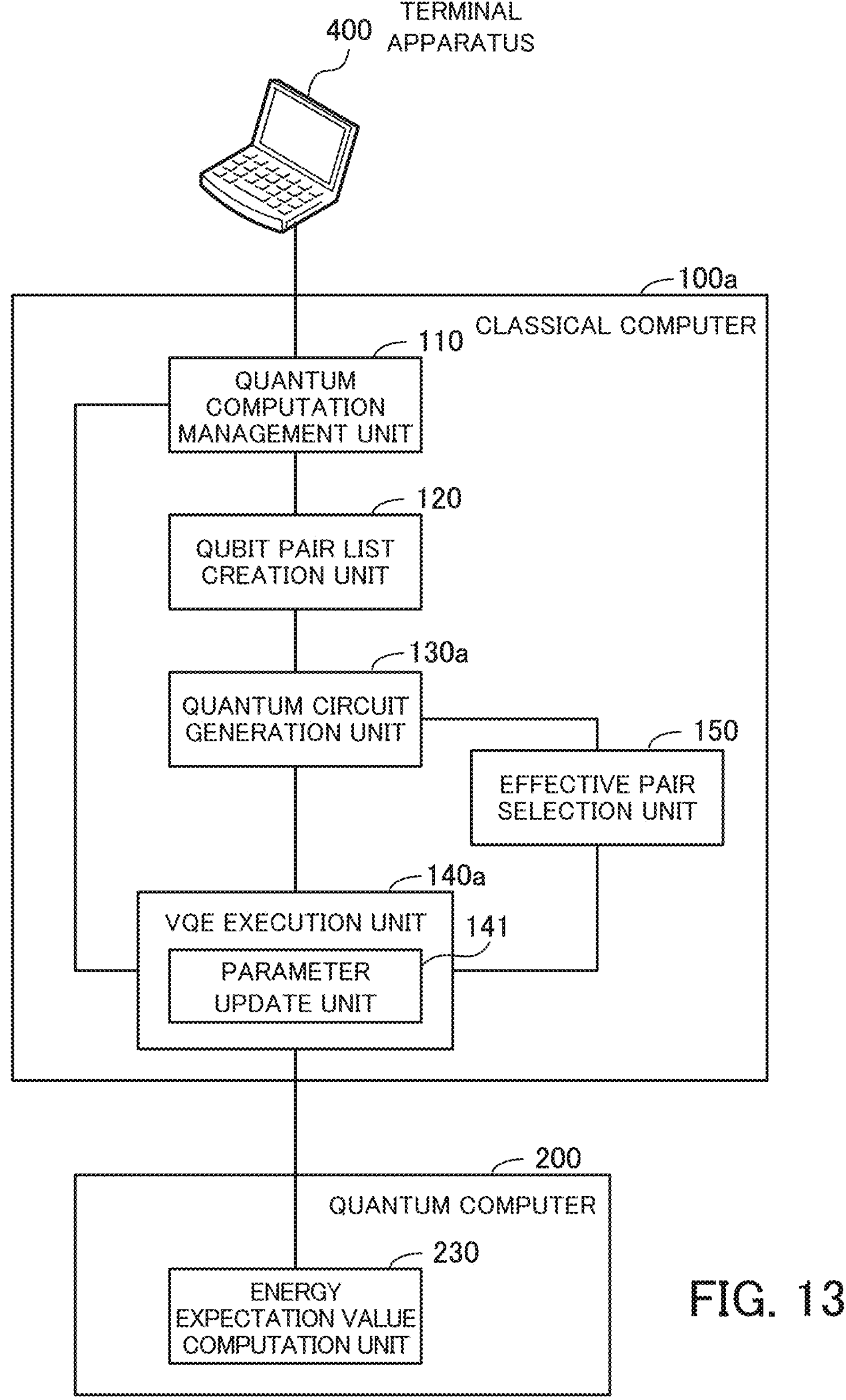
FIG. 13 illustrates a functional example for a quantum chemical computation according to a third embodiment.

FIG. 13 illustrates a functional example for a quantum chemical computation according to the third embodiment. Of all the elements in FIG. 13, those having the same functions as those according second embodiment are denoted by the same reference characters as those in FIG. 7, and description thereof will be omitted.

A classical computer 100*a* includes a quantum computation management unit 110, a qubit pair list creation unit 120, a quantum circuit generation unit 130*a*, a VQE execution unit 140*a*, and an effective pair selection unit 150. The process executed by the quantum circuit generation unit 130*a* and the process executed by the VQE execution unit 140*a* included in the classical computer 100*a* according to the third embodiment differ from those of the quantum circuit generation unit 130 and the VQE execution unit 140 according to the second embodiment. In addition, the classical computer 100*a* according to the third embodiment further includes the effective pair selection unit 150.

When the quantum circuit generation unit 130*a* acquires a qubit pair list from the qubit pair list creation unit 120, the quantum circuit generation unit 130*a* generates an ansatz circuit for each of the qubit pairs in the qubit pair list. Each of the generated ansatz circuits is an ansatz circuit that applies a quantum gate boxA only to a corresponding qubit pair. The quantum circuit generation unit 130*a* transmits a plurality of VQE quantum circuits including their respective ansatz circuits generated to the VQE execution unit 140*a*.

In addition, when the quantum circuit generation unit 130*a* acquires, from the effective pair selection unit 150, a list of qubit pairs (effective pairs) effective in computing the energy expectation value, the quantum circuit generation unit 130*a* generates an ansatz circuit that applies a quantum gate boxA to each of the effective pairs. Next, the quantum circuit generation unit 130*a* transmits a VQE quantum circuit including the generated ansatz circuit to the VQE execution unit 140*a*.

The VQE execution unit 140*a* executes the VQE based on the acquired quantum circuit in coordination with the quantum computer 200. When the VQE execution unit 140*a* executes the VQE using the ansatz circuits, each of which applies a quantum gate boxA only to a single qubit pair, the VQE execution unit 140*a* transmits the computation results to the effective pair selection unit 150. In addition, when the VQE execution unit 140*a* executes the VQE using the ansatz circuit that applies a quantum gate boxA to each effective pair, the VQE execution unit 140*a* transmits the computation result to the quantum computation management unit 110.

Based on the execution results of the VQE using the ansatz circuits, each of which applies a quantum gate boxA only to a single qubit pair, the effective pair selection unit 150 determines the effectiveness of the application of the individual quantum gate boxA to the corresponding qubit pair. The effective pair selection unit 150 transmits the list of qubit pairs determined to be effective to the quantum circuit generation unit 130*a* as the effective pairs.

Next, a procedure of the process of the quantum chemical computation according to the third embodiment will be described in detail.

Figure 14:
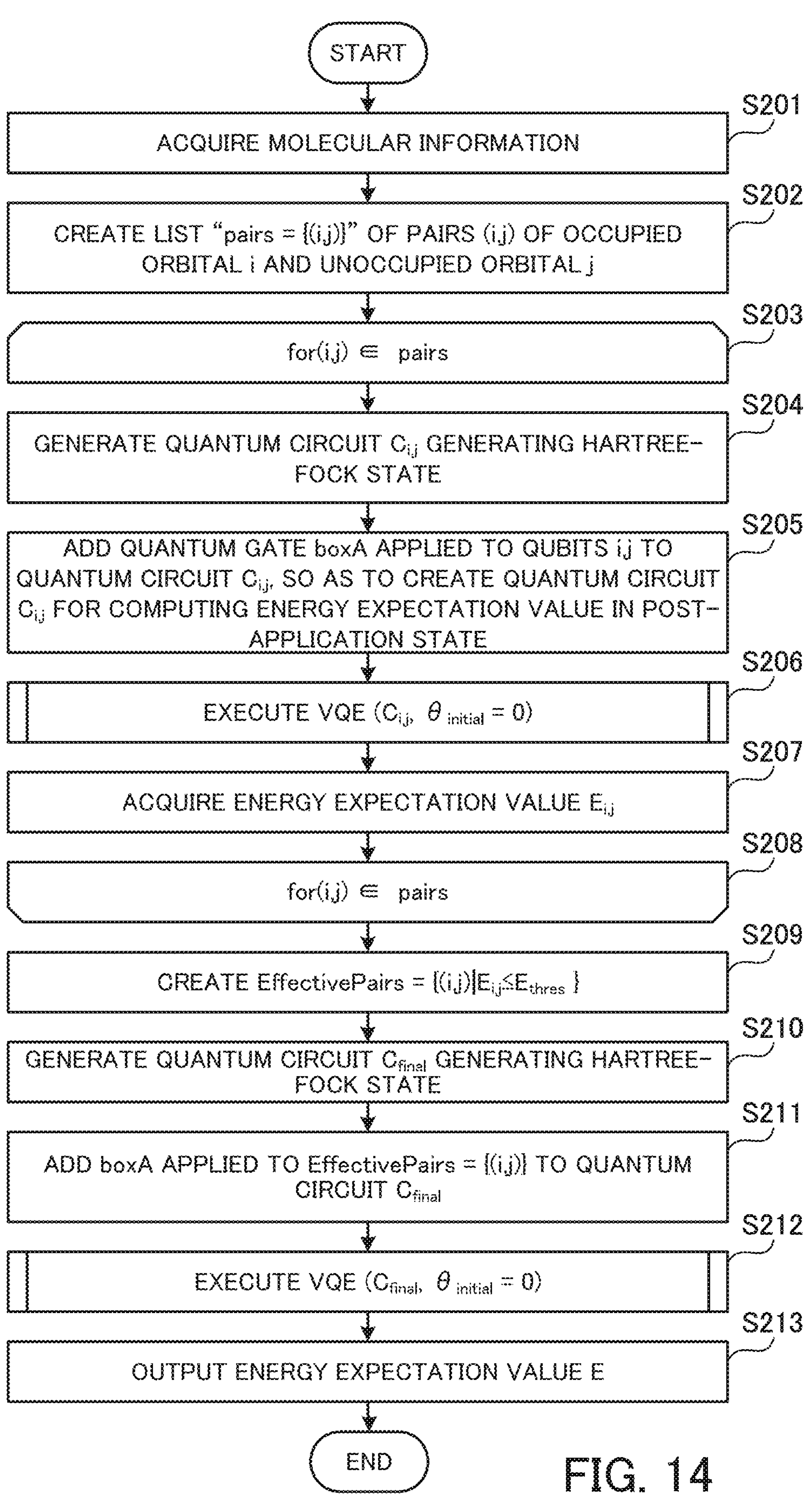
FIG. 14 is a flowchart illustrating an example of a procedure of the quantum chemical computation according to the third embodiment.

FIG. 14 is a flowchart illustrating an example of a procedure of the quantum chemical computation according to the third embodiment. Hereinafter, the process illustrated in FIG. 14 will be described in accordance with the order of the step numbers.

[Step S201] The quantum computation management unit 110 acquires molecular information about a computation target molecule from the terminal apparatus 400. The molecular information includes the number of orbitals of the molecule whose energy in the ground state is to be computed, the number of electrons of the molecule, the Hamiltonian indicating the energy of the molecule, and the active space, for example.

[Step S202] The qubit pair list creation unit 120 determines qubit pairs to which the gate operation of a quantum gate boxA could be applied in the VQE, and creates a qubit pair list indicating the determined qubit pairs. For example, the qubit pair list creation unit 120 determines a group of all pairs (i,j), where i denotes a number of a qubit corresponding to an occupied orbital and j denotes a number of a qubit corresponding to an unoccupied orbital, so as to create the qubit pair list "pairs={(i,j)}".

[Step S203] The quantum circuit generation unit 130*a* and the VQE execution unit 140*a* execute steps S204 to S207 for each qubit pair (i,j) included in the qubit pair list in coordination with each other.

[Step S204] The quantum circuit generation unit 130*a* generates a quantum circuit $C_{i,j}$ that generates a Hartree-Fock state.

[Step S205] The quantum circuit generation unit 130*a* adds a quantum gate boxA applied to a process target qubit pair to the quantum circuit $C_{i,j}$, so as to create a quantum circuit $C_{i,j}$ for computing the energy expectation value in the post-application state.

[Step S206] In coordination with the quantum computer 200, the VQE execution unit 140*a* executes the VQE by using a trial state indicated by the quantum circuit $C_{i,j}$. The VQE execution unit 140*a* sets an initial value $\theta_{initial}$ for the corresponding parameter θ used in the VQE to "0". Upon completion of the VQE, the VQE execution unit 140*a* transmits the energy expectation value obtained from the execution result of the VQE to the effective pair selection unit 150.

[Step S207] The effective pair selection unit 150 acquires an energy expectation value $E_{i,j}$ corresponding the process target qubit pair (i,j).

[Step S208] When all the qubit pairs (i,j) included in the qubit pair list are processed, the VQE execution unit 140*a* executes step S209.

[Step S209] The effective pair selection unit 150 generates an effective pair list (EffectivePairs) based on the energy expectation values $E_{i,j}$ of the process target qubit pairs (i,j). For example, the effective pair selection unit 150 compares each of the energy expectation values $E_{i,j}$ with a threshold $E_{thres}$. The effective pair selection unit 150 creates a list of qubit pairs whose energy expectation value $E_{i,j}$ is equal to or less than the threshold $E_{thres}$ as the effective pair list (EffectivePairs=$\{(i,j)|E_{i,j} \leq E_{thres}\}$).

[Step S210] The quantum circuit generation unit 130*a* generates a quantum circuit $C_{final}$ that generates a Hartree-Fock state.

[Step S211] The quantum circuit generation unit 130*a* adds the quantum gate boxAs applied to their respective qubit pairs indicated by the effective pair list "EffectivePairs={(i,j)}" to the quantum circuit $C_{final}$, so as to create a quantum circuit $C_{final}$ for computing the energy expectation value in the post-application state.

[Step S212] In coordination with the quantum computer 200, the VQE execution unit 140*a* executes the VQE by using the trial state indicated by the quantum circuit $C_{final}$. The VQE execution unit 140*a* sets an initial value $\theta_{initial}$ for the individual parameters θ used in the VQE to "0". Upon completion of the VQE, the VQE execution unit 140*a* transmits the energy expectation value obtained from the execution result of the VQE to the quantum computation management unit 110.

[Step S213] The quantum computation management unit 110 outputs an energy expectation value E. For example, the quantum computation management unit 110 transmits the energy expectation value E as the VQE execution result to the terminal apparatus 400.

As described above, it is possible to execute the VQE by using an ansatz circuit in which a quantum gate boxA is applied only to the qubit pairs effective in improving the accuracy of the energy expectation value. As a result, it is possible to reduce the number of quantum gate boxAs without deteriorating the accuracy of the energy expectation value.

Fourth Embodiment

In a fourth embodiment, based on the derivative of an energy expectation value computed by an ansatz circuit in which a quantum gate boxA is applied only to a single qubit pair, the energy reduction effect when the quantum gate boxA is applied to the single qubit pair is evaluated. For example, by using an ansatz circuit in which a quantum gate boxA is applied only to a single qubit pair, the derivative of the corresponding energy expectation value when parameter θ=0 is computed. Assuming that the value of the parameter θ set for a quantum gate boxA applied to a qubit pair (i,j) is "$\theta_{i,j}$", the derivative function of the energy expectation value is given by the following Expression.

$$\frac{d}{d\theta_{i,j}} \langle \Psi(\theta_{i,j}) | H | \Psi(\theta_{i,j}) \rangle \tag{4}$$

The value of the derivative function when "$\theta_{i,j}=0$" is the derivative of the energy expectation value when parameter θ=0. In the fourth embodiment, the VQE is executed by using an ansatz circuit in which a quantum gate boxA is applied to all the qubit pairs whose derivative is equal to or greater than a threshold.

FIG. 15 illustrates a second example of the ansatz circuit that applies a quantum gate boxA only to the qubit pairs having a high effect on dropping the energy expectation value. For example, assuming that five electrons are present on seven molecular orbitals, five of the seven qubits are associated with occupied orbitals in the Hartree-Fock state, and the other two qubits are associated with unoccupied orbitals in the Hartree-Fock state.

In the fourth embodiment, a plurality of evaluation ansatz circuits, each of which applies a quantum gate boxA only to a single qubit pair, are generated. For example, an ansatz circuit 61 applies a quantum gate boxA to a first qubit and a sixth qubit. An ansatz circuit 62 applies a quantum gate boxA to a fourth qubit and the sixth qubit. An ansatz circuit 63 applies a quantum gate boxA to the fourth qubit and a seventh qubit. An ansatz circuit 64 applies a quantum gate boxA to a fifth qubit and the sixth qubit. An ansatz circuit 65 applies a quantum gate boxA to the fifth qubit and the seventh qubit.

By using each of these ansatz circuits, the derivatives of the energy expectation values when "$\theta_{i,j}=0$" are computed, and the energy expectation values for their respective ansatz circuits are obtained. If the derivative of the obtained energy expectation value is equal to or less than a threshold $D_{thres}$, the corresponding qubit pair to which the quantum gate boxA has been applied by the corresponding ansatz circuit used for the computation of the corresponding energy expectation value is determined to have a high effect on dropping the energy expectation value.

In the example in FIG. 15, regarding the qubit pair of the first qubit and the sixth qubit, the derivative $D_{1,6}$ of the energy expectation value obtained by using the corresponding ansatz circuit 61 is less than the threshold $D_{thres}$. Thus, the qubit pair of the first qubit and the sixth qubit is determined to have a low effect on dropping the energy expectation value through the application of the quantum gate boxA.

On the other hand, regarding the qubit pair of the fourth qubit and the sixth qubit, the derivative $D_{4,6}$ of the energy expectation value obtained based on the VQE using the corresponding ansatz circuit 62 is equal to or greater than the threshold $D_{thres}$. Thus, the qubit pair of the fourth qubit and the sixth qubit is determined to have a high effect on dropping the energy expectation value through the application of the quantum gate boxA.

An ansatz circuit 66 is generated based on the determination results as described above. The ansatz circuit 66 applies a quantum gate boxA only to each qubit pair determined to have a high effect on dropping the energy expectation value. The VQE is executed by using the ansatz circuit 66. In this way, it is possible to reduce the number of quantum gate boxAs without deteriorating the computation accuracy.

Figure 16:
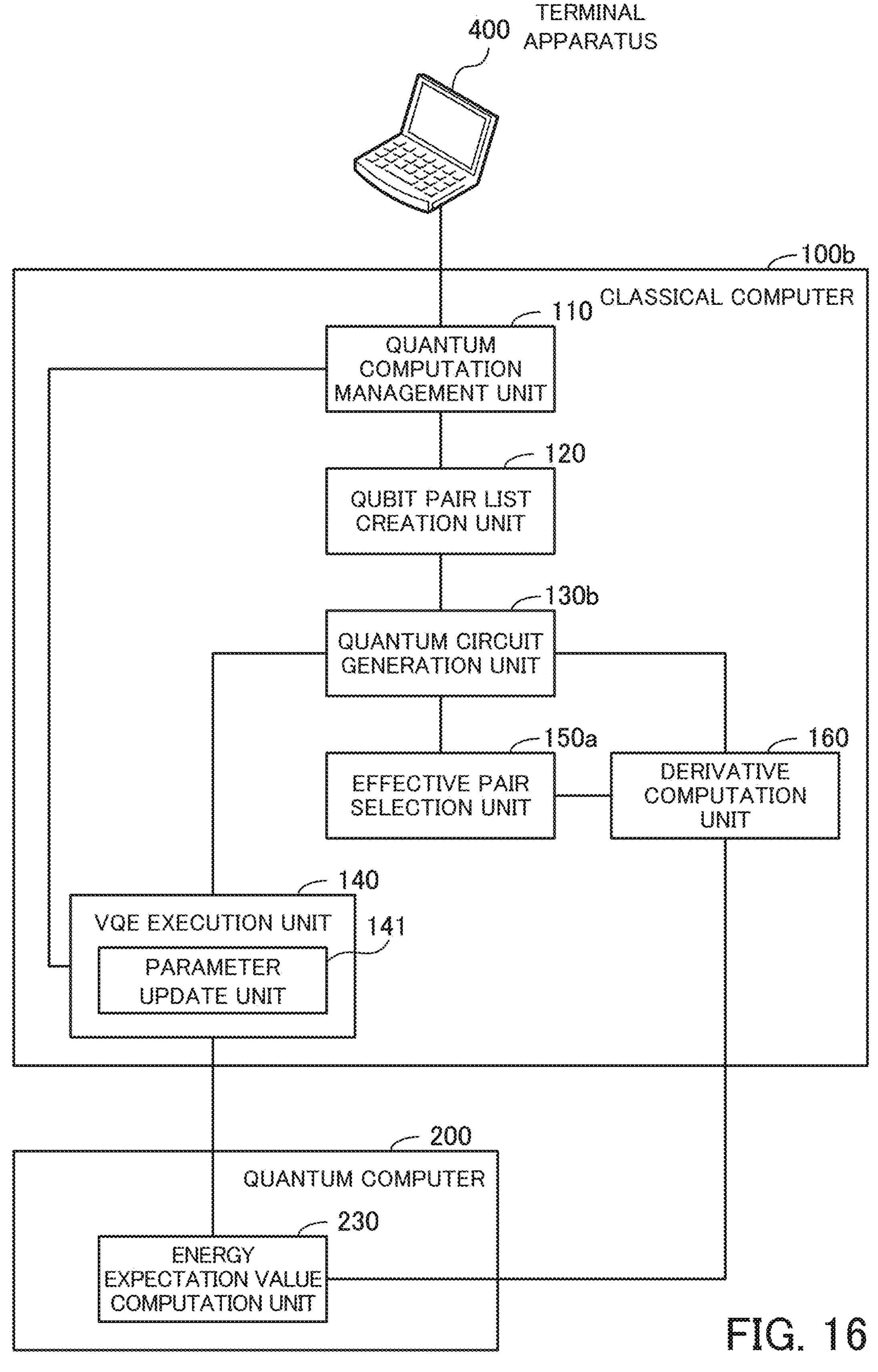
FIG. 16 illustrates a functional example for a quantum chemical computation according to a fourth embodiment.

FIG. 16 illustrates a functional example for a quantum chemical computation according to the fourth embodiment. Of all the elements in FIG. 16, those having the same functions as those according to the second embodiment are denoted by the same reference characters as those in FIG. 7, and description thereof will be omitted.

A classical computer 100*b* includes a quantum computation management unit 110, a qubit pair list creation unit 120, a quantum circuit generation unit 130*b*, a VQE execution unit 140, an effective pair selection unit 150*a*, and a derivative computation unit 160. The process executed by the quantum circuit generation unit 130*b* included in the classical computer 100*b* according to the fourth embodiment differs from that of the quantum circuit generation unit 130 according to the second embodiment. In addition, the classical computer 100*b* according to the fourth embodiment further includes the derivative computation unit 160 and the effective pair selection unit 150*a*.

When the quantum circuit generation unit 130*b* acquires a qubit pair list from the qubit pair list creation unit 120, the quantum circuit generation unit 130*b* generates an ansatz circuit for each of the qubit pairs in the qubit pair list. Each of the generated ansatz circuits is an ansatz circuit that applies a quantum gate boxA only to a corresponding qubit pair. The quantum circuit generation unit 130*b* transmits a plurality of VQE quantum circuits including their respective ansatz circuits generated to the derivative computation unit 160.

In addition, when the quantum circuit generation unit 130*b* acquires, from the effective pair selection unit 150*a*, a list of qubit pairs (effective pairs) effective in computing the energy expectation value, the quantum circuit generation unit 130*b* generates ansatz circuits, each of which applies a quantum gate boxA to an effective pair. Next, the quantum circuit generation unit 130*b* transmits a VQE quantum circuit including the generated ansatz circuits to the VQE execution unit 140.

The derivative computation unit 160 acquires the quantum circuits applied to their respective qubit pairs from the quantum circuit generation unit 130*b*, and causes a quantum computer 200 to execute the quantum circuits by using the different values of the parameters θ. Based on the energy expectation values obtained as the execution results of the quantum circuits, the derivative computation unit 160 computes the derivatives when the parameters θ used for the energy expectation values of their respective qubit pairs are 0. Next, the derivative computation unit 160 transmits the derivatives of the energy expectation values of their respective qubit pairs to the effective pair selection unit 150*a*.

Based on each of the derivatives of the energy expectation values of their respective qubit pairs, the effective pair selection unit 150*a* determines whether application of a quantum gate boxA to an individual qubit pair is effective in improving the accuracy of the corresponding energy expectation value. The effective pair selection unit 150*a* transmits a list of qubit pairs determined to be effective to the quantum circuit generation unit 130*b* as the effective pairs.

Next, a procedure of a process of the quantum chemical computation according to the fourth embodiment will be described in detail.

Figure 17:
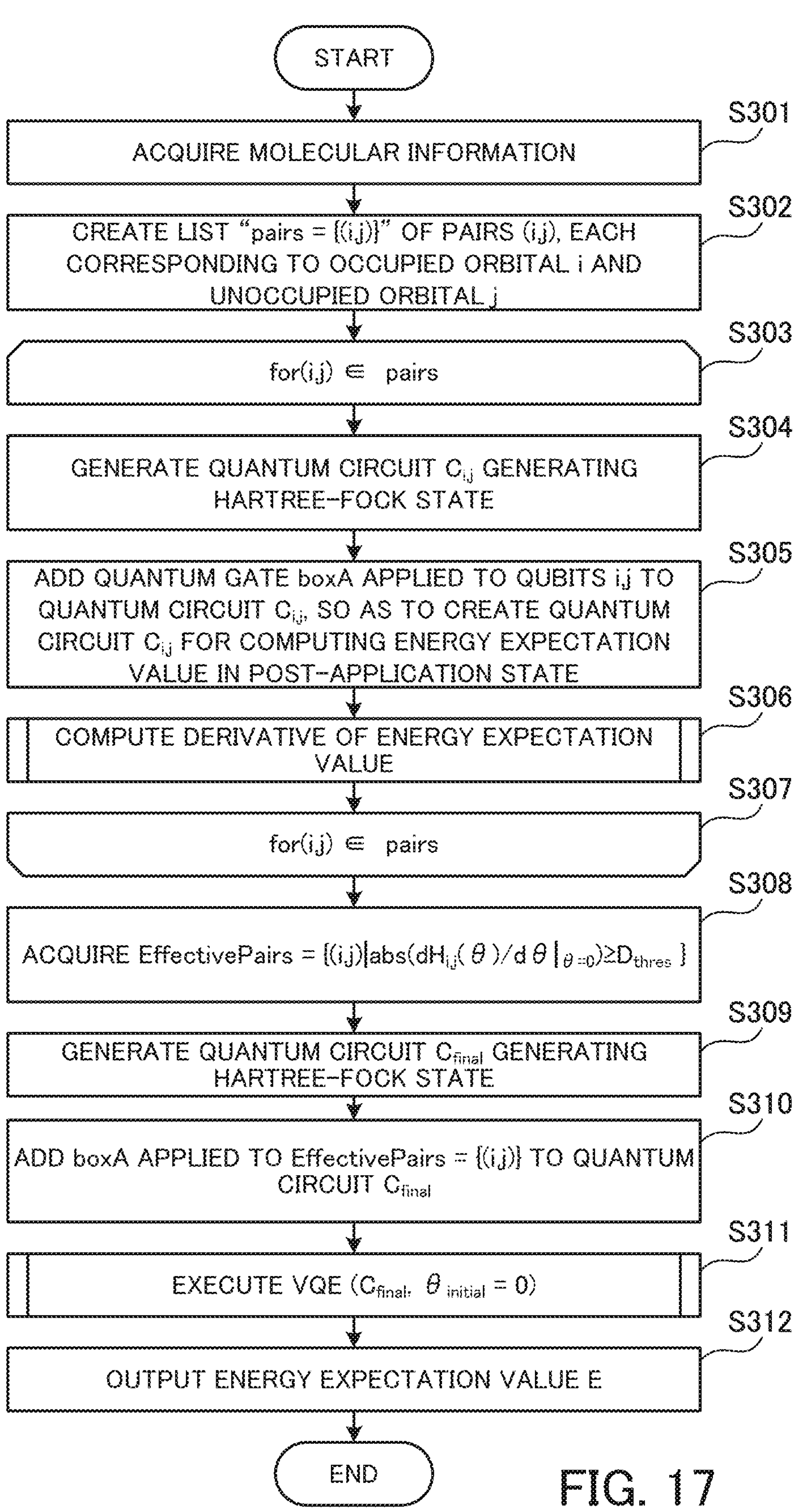
FIG. 17 is a flowchart illustrating an example of a procedure of the quantum chemical computation according to the fourth embodiment.

FIG. 17 is a flowchart illustrating an example of a procedure of the quantum chemical computation according to the fourth embodiment. Hereinafter, the process illustrated in FIG. 17 will be described in accordance with the order of the step numbers.

[Step S301] The quantum computation management unit 110 acquires molecular information about a computation target molecule from the terminal apparatus 400. The molecular information includes the number of orbitals of the molecule whose energy in the ground state is to be computed, the number of electrons of the molecule, the number of qubits used for the VQE, and the Hamiltonian indicating the energy of the molecule, for example.

[Step S302] The qubit pair list creation unit 120 determines qubit pairs to which the gate operation of a quantum gate boxA could be applied in the VQE, and creates a qubit pair list indicating the determined qubit pairs. For example, the qubit pair list creation unit 120 determines a group of all pairs (i,j), where i denotes a number of a qubit corresponding to an occupied orbital and j denotes a number of a qubit corresponding to an unoccupied orbital, so as to create the qubit pair list "pairs={(i,j)}".

[Step S303] The quantum circuit generation unit 130*b* and the derivative computation unit 160 execute steps S304 to S306 for each qubit pair (i,j) included in the qubit pair list in coordination with each other.

[Step S304] The quantum circuit generation unit 130*b* generates a quantum circuit $C_{i,j}$ that generates a Hartree-Fock state.

[Step S305] The quantum circuit generation unit 130*b* adds a quantum gate boxA applied to a process target qubit pair (i,j) to the quantum circuit $C_{i,j}$, so as to create a quantum circuit $C_{i,j}$ for computing the energy expectation value in the post-application state.

[Step S306] In coordination with the quantum computer 200, the derivative computation unit 160 executes a process for computing the derivative of each of the energy expectation values. This process will be described in detail below (see FIG. 18). The calculated derivatives of the energy expectation values are transmitted to the effective pair selection unit 150*a*.

[Step S307] If the derivatives of the energy expectation values of all the qubit pairs (i,j) have been computed, the quantum circuit generation unit 130*b* executes step S308.

[Step S308] The effective pair selection unit 150*a* generates an effective pair list (EffectivePairs) based on the derivatives $D_{i,j}$ of the energy expectation values of the qubit pairs (i,j). For example, the effective pair selection unit 150*a* compares the absolute value $|D_{i,j}|$ of each of the derivatives $D_{i,j}$ of the energy expectation values with a threshold $D_{thres}$. The effective pair selection unit 150*a* creates a list of qubit pairs whose absolute value $|D_{i,j}|$ of the derivative is equal to or greater than the threshold $D_{thres}$ as the effective pair list (EffectivePairs=$\{(i,j)|abs(dH_{i,j}(\theta)/d\theta|\theta=0)\geq D_{thres}\}$).

[Step S309] The quantum circuit generation unit 130*b* generates a quantum circuit $C_{final}$ that generates a Hartree-Fock state.

[Step S310] The quantum circuit generation unit 130*b* adds the quantum gate boxAs applied to their respective qubit pairs indicated by the effective pair list "EffectivePairs=$\{(i,j)\}$" to the quantum circuit $C_{final}$, so as to create a quantum circuit $C_{i,j}$ for computing the energy expectation value in the post-application state.

[Step S311] In coordination with the quantum computer 200, the VQE execution unit 140 executes the VQE by using the trial state indicated by the quantum circuit $C_{final}$. The VQE execution unit 140 sets an initial value $\theta_{initial}$ for the individual parameter θ used in the VQE to "0". Upon completion of the VQE, the VQE execution unit 140 transmits the energy expectation value obtained from the VQE execution result to the quantum computation management unit 110.

[Step S312] The quantum computation management unit 110 outputs an energy expectation value E. For example, the quantum computation management unit 110 transmits the energy expectation value E as the VQE execution result to the terminal apparatus 400.

Next, a process for computing the derivative of an energy expectation value will be described in detail.

Figure 18:
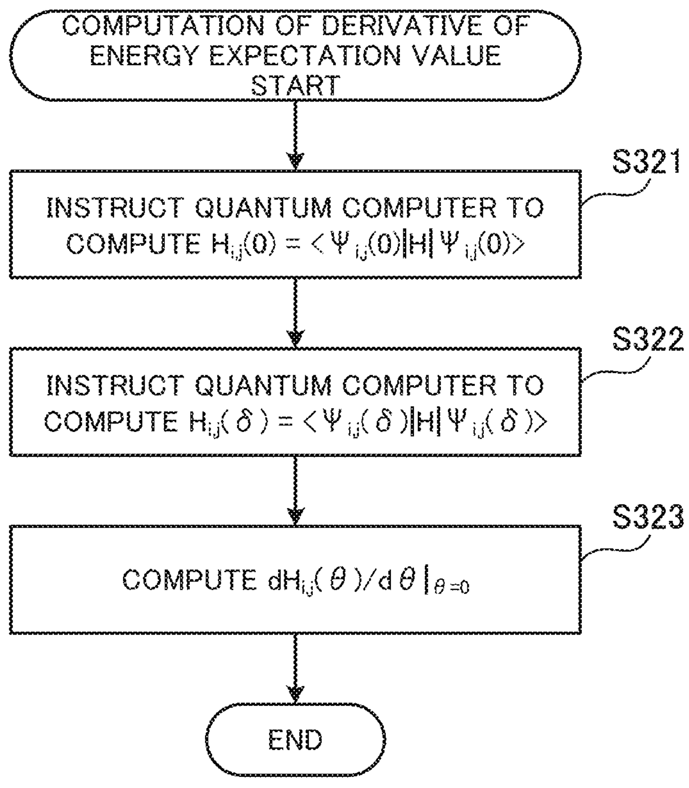
FIG. 18 is a flowchart illustrating an example of a procedure of a process for computing the derivative of an energy expectation value.

FIG. 18 is a flowchart illustrating an example of a procedure of a process for computing the derivative of an energy expectation value. Hereinafter, the process illustrated in FIG. 18 will be described in accordance with the order of the step numbers.

[Step S321] The derivative computation unit 160 instructs the quantum computer 200 to compute an energy expectation value $H_{i,j}(0)=\langle\Psi_{i,j}(0)|H|\Psi_{i,j}(0)\rangle$ in the trial state (θ=0). As a result, the derivative computation unit 160 acquires the energy expectation value when the parameter θ=0 from the quantum computer 200.

[Step S322] The derivative computation unit 160 instructs the quantum computer 200 to compute an energy expectation value $H_{i,j}(\delta)=\langle\Psi_{i,j}(\delta)|H|\Psi_{i,j}(\delta)\rangle$ in the trial state (θ=δ) (δ is a predetermined real number value). As a result, the derivative computation unit 160 acquires the energy expectation value when the parameter θ=δ from the quantum computer 200.

[Step S323] The derivative computation unit 160 computes a derivative "$dH_{i,j}(\theta)/d\theta|_{\theta=0}$" when the parameter θ=0.

In this way, it is possible to execute the VQE by using an ansatz circuit that applies a quantum gate boxA only to qubit pairs, each of which is effective in improving the accuracy of the energy expectation value. As a result, it is possible to reduce the number of quantum gate boxAs without reducing the accuracy of the energy expectation value. In addition, because the fourth embodiment enables the computation of the qubit pairs effective in improving the accuracy of the energy expectation value more easily, the fourth embodiment achieves a better processing efficiency than that according to the third embodiment.

In one aspect, it is possible to shorten the computation time of the energy expectation value in the ground state of a molecule.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable recording medium storing therein a computer program that causes a computer to execute a process comprising:

creating, from a plurality of qubits, a plurality of qubit pairs, each of which is formed by combining a first qubit corresponding to a first orbital on which an electron is present in an initial arrangement and a second qubit corresponding to a second orbital on which no electron is present in the initial arrangement, each of the plurality of qubits indicating presence or absence of an electron occupying a corresponding one of a plurality of orbitals of a molecule;

generating a quantum circuit that applies two-qubit gates to at least some of the plurality of qubit pairs, each of the two-qubit gates generating, based on a value of a parameter, a superposition state of a first state in which a state of the first qubit and a state of the second qubit are not switched and a second state in which the state of the first qubit and the state of the second qubit are switched; and acquiring an energy expectation value in a ground state of the molecule by causing a quantum computer to iteratively execute the quantum circuit while updating the value of the parameter of the each of the two-qubit gates.

2. The non-transitory computer-readable recording medium according to claim 1, wherein the generating of the quantum circuit includes computing, for each of the plurality of qubit pairs, an evaluation value about an effect on dropping the energy expectation value of the molecule through application of a corresponding one of the two-qubit gates and determining, based on the evaluation value, qubit pairs to which a two-qubit gate is applied.

3. The non-transitory computer-readable recording medium according to claim 2, wherein the generating of the quantum circuit includes generating evaluation quantum circuits, each of which applies a two-qubit gate to a qubit pair of an evaluation target and does not apply the two-qubit gate to a qubit pair that is not an evaluation target, and determining an energy expectation value obtained by causing the quantum computer to iteratively execute each of the evaluation quantum circuits while updating the value of the parameter of the each of the two-qubit gates to be the evaluation value.

4. The non-transitory computer-readable recording medium according to claim 2, wherein the generating of the quantum circuit includes generating evaluation quantum circuits, each of which applies a two-qubit gate to a qubit pair of an evaluation target and does not apply the two-qubit gate to a qubit pair that is not an evaluation target, causing the quantum computer to execute the evaluation quantum circuits, acquiring a derivative of an energy expectation value when the parameter of the each of the two-qubit gates is a predetermined value, and determining the derivative to be the evaluation value.

5. The non-transitory computer-readable recording medium according to claim 1, wherein the creating of the plurality of qubit pairs includes preventing creation of a qubit pair of the first qubit corresponding to the first orbital on which an x-spin electron is placeable and the second qubit corresponding to the second orbital on which a β-spin electron is placeable and preventing creation of a qubit pair of the first qubit corresponding to the first orbital on which a β-spin electron is placeable and the second qubit corresponding to the second orbital on which an α-spin electron is placeable.

6. A quantum computation control method comprising:

creating from a plurality of qubits, a plurality of qubit pairs, each of which is formed by combining a first qubit corresponding to a first orbital on which an electron is present in an initial arrangement and a second qubit corresponding to a second orbital on which no electron is present in the initial arrangement, each of the plurality of qubits indicating presence or absence of an electron occupying a corresponding one of a plurality of orbitals of a molecule;

generating, by a processor, a quantum circuit that applies two-qubit gates to at least some of the plurality of qubit pairs, each of the two-qubit gates generating, based on a value of a parameter, a superposition state of a first state in which a state of the first qubit and a state of the second qubit are not switched and a second state in which the state of the first qubit and the state of the second qubit are switched; and acquiring, by the processor, an energy expectation value in a ground state of the molecule by causing a quantum computer to iteratively execute the quantum circuit while updating the value of the parameter of the each of the two-qubit gates.

7. An information processing apparatus comprising:

a memory; and a processing coupled to the memory and the processor configured to:

create, from a plurality of qubits, a plurality of qubit pairs, each of which is formed by combining a first qubit corresponding to a first orbital on which an electron is present in an initial arrangement and a second qubit corresponding to a second orbital on which no electron is present in the initial arrangement, each of the plurality of qubits indicating presence or absence of an electron occupying a corresponding one of a plurality of orbitals of a molecule;

generate a quantum circuit that applies two-qubit gates to at least some of the plurality of qubit pairs, each of the two-qubit gates generating, based on a value of a parameter, a superposition state of a first state in which a state of the first qubit and a state of the second qubit are not switched and a second state in which the state of the first qubit and the state of the second qubit are switched; and acquire an energy expectation value in a ground state of the molecule by causing a quantum computer to iteratively execute the quantum circuit while updating the value of the parameter of the each of the two-qubit gates.

* * * * *